United States Patent
Palin et al.

(10) Patent No.: US 9,265,080 B1
(45) Date of Patent: Feb. 16, 2016

(54) METHOD, APPARATUS, AND COMPUTER PROGRAM PRODUCT FOR MULTI-DEVICE OUTPUT MODE CONFIGURATION

(71) Applicant: Nokia Corporation, Espoo (FI)

(72) Inventors: Arto Palin, Viiala (FI); Jukka Reunamaki, Tampere (FI); Niko Kiukkonen, Veikkola (FI); Antti Rantaeskola, Tampere (FI)

(73) Assignee: Nokia Technologies Oy, Espoo (FI)

( * ) Notice: Subject to any disclaimer, the term of this patent is extended or adjusted under 35 U.S.C. 154(b) by 267 days.

(21) Appl. No.: 14/503,557

(22) Filed: Oct. 1, 2014

(51) Int. Cl.
H04W 76/02 (2009.01)
H04W 4/00 (2009.01)
H04W 8/00 (2009.01)

(52) U.S. Cl.
CPC ............ *H04W 76/023* (2013.01); *H04W 4/008* (2013.01); *H04W 8/005* (2013.01); *H04W 76/025* (2013.01)

(58) Field of Classification Search
CPC .................................................... H04B 5/0031
USPC .............................................. 455/41.1–41.3
See application file for complete search history.

(56) References Cited

U.S. PATENT DOCUMENTS

| 5,530,702 | A | 6/1996 | Palmer et al. |
| 6,816,063 | B2 | 11/2004 | Kubler et al. |
| 6,892,052 | B2 | 5/2005 | Kotola et al. |
| 7,075,412 | B1 | 7/2006 | Reynolds et al. |
| 7,151,764 | B1 | 12/2006 | Heinonen et al. |
| 7,519,682 | B2 | 4/2009 | Smith et al. |
| 7,775,432 | B2 | 8/2010 | Jalkanen et al. |
| 8,210,433 | B2 | 7/2012 | Jalkanen et al. |
| 8,976,846 | B2 * | 3/2015 | Shimizu et al. ............... 375/219 |
| 2001/0045460 | A1 | 11/2001 | Reynolds et al. |

(Continued)

FOREIGN PATENT DOCUMENTS

| EP | 2073514 | 6/2009 |
| EP | 2355563 | 8/2011 |

(Continued)

OTHER PUBLICATIONS

International Search Report for International Application No: PCT/FI2012/050442—Date of Completion of Search: Sep. 18, 2012—4 pages.

(Continued)

*Primary Examiner* — Tuan H Nguyen
(74) *Attorney, Agent, or Firm* — Locke Lord LLP

(57) ABSTRACT

In an example embodiment, a method includes receiving, by an apparatus, streaming content over a first wireless carrier, from a source device; discovering, by the apparatus, wireless messages over a second wireless carrier, associated with presence of a wireless device capable of receiving streaming content over the first wireless carrier and capable of reproducing at least a portion of the received streaming content; determining, by the apparatus, that wireless messages received from another wireless device over the second wireless carrier, indicate a wireless device capable of receiving streaming content over the first wireless carrier and capable of reproducing at least a portion of the received streaming content; and activating, by the apparatus, over the second wireless carrier, a wireless connection with the other wireless device over the first wireless carrier, and forwarding the streaming content over the wireless connection to the other wireless device.

21 Claims, 12 Drawing Sheets

(56) References Cited

U.S. PATENT DOCUMENTS

| | | |
|---|---|---|
| 2002/0021809 A1 | 2/2002 | Salo et al. |
| 2002/0022961 A1 | 2/2002 | Sepanaho |
| 2002/0023264 A1 | 2/2002 | Aaltonen et al. |
| 2002/0069406 A1 | 6/2002 | Aaltonen et al. |
| 2002/0071436 A1 | 6/2002 | Border et al. |
| 2002/0087997 A1 | 7/2002 | Dahlstrom |
| 2002/0191998 A1 | 12/2002 | Cremon et al. |
| 2003/0043041 A1 | 3/2003 | Zeps et al. |
| 2003/0084177 A1 | 5/2003 | Mulligan |
| 2003/0097304 A1 | 5/2003 | Hunt |
| 2003/0120745 A1 | 6/2003 | Katagishi et al. |
| 2003/0134653 A1 | 7/2003 | Sarkkinen et al. |
| 2003/0220765 A1 | 11/2003 | Ovary et al. |
| 2003/0228846 A1 | 12/2003 | Berliner et al. |
| 2004/0193676 A1 | 9/2004 | Marks |
| 2004/0203413 A1 | 10/2004 | Harumoto |
| 2004/0225199 A1 | 11/2004 | Evanyk et al. |
| 2005/0054290 A1 | 3/2005 | Logan et al. |
| 2005/0073522 A1 | 4/2005 | Aholainen et al. |
| 2007/0047505 A1 | 3/2007 | Wassingbo |
| 2007/0141984 A1 | 6/2007 | Kuehnel et al. |
| 2007/0141985 A1 | 6/2007 | Parkkinen et al. |
| 2007/0275746 A1 | 11/2007 | Bitran |
| 2007/0291710 A1 | 12/2007 | Fadell |
| 2008/0004021 A1 | 1/2008 | Sanjay |
| 2008/0055632 A1 | 3/2008 | Oshiumi et al. |
| 2008/0090606 A1 | 4/2008 | Hwang et al. |
| 2008/0146151 A1 | 6/2008 | Lyu et al. |
| 2008/0242220 A1 | 10/2008 | Wilson et al. |
| 2008/0311957 A1 | 12/2008 | Jantunen et al. |
| 2010/0082784 A1 | 4/2010 | Rosenblatt et al. |
| 2010/0093280 A1 | 4/2010 | Ahn et al. |
| 2010/0105328 A1 | 4/2010 | Ahn et al. |
| 2010/0144274 A1 | 6/2010 | McDowall et al. |
| 2010/0211698 A1 | 8/2010 | Krishnaswamy |
| 2010/0241529 A1 | 9/2010 | Kim |
| 2010/0250135 A1 | 9/2010 | Li et al. |
| 2011/0140864 A1 | 6/2011 | Bucci |
| 2011/0140883 A1 | 6/2011 | Yamashita |
| 2011/0235624 A1 | 9/2011 | Scott et al. |
| 2011/0317586 A1 | 12/2011 | Palanki et al. |
| 2012/0015605 A1 | 1/2012 | Sole |
| 2012/0017257 A1 | 1/2012 | Lee et al. |
| 2012/0169473 A1 | 7/2012 | Jalkanen et al. |
| 2012/0289157 A1 | 11/2012 | Palin et al. |
| 2012/0289158 A1 | 11/2012 | Palin et al. |
| 2012/0289159 A1 | 11/2012 | Palin et al. |
| 2013/0010716 A1* | 1/2013 | Dinan ............ 370/329 |
| 2013/0111120 A1 | 5/2013 | Ananthakrishnan et al. |
| 2014/0194062 A1 | 7/2014 | Palin et al. |

FOREIGN PATENT DOCUMENTS

| | | |
|---|---|---|
| EP | 2424281 | 2/2012 |
| WO | WO0051293 | 8/2000 |
| WO | WO0067221 | 11/2000 |
| WO | WO 01/45319 | 6/2001 |
| WO | WO 02/11074 | 2/2002 |
| WO | WO2004038938 | 5/2004 |
| WO | WO2007040398 | 4/2007 |
| WO | WO2008072057 | 6/2008 |
| WO | WO200913646 | 1/2009 |
| WO | WO2009158663 | 12/2009 |
| WO | WO01/52179 | 7/2011 |
| WO | WO2012127095 | 9/2012 |
| WO | WO2013083868 | 6/2013 |
| WO | WO2013132134 A1 | 9/2013 |

OTHER PUBLICATIONS

European Search Report for EP Application No. 08006467.8-2412/1965555 dated Nov. 2, 2011.
Extended European Search Report for European Patent Application No. 12167079.8-2412—dated Jul. 30, 2012.
Office Action for Korean Application No. 10-2006-7009441 dated Apr. 23, 2007.
Notice of Allowance for Korean Application No. 10-2006-7009441 dated Jan. 7, 2008.
Palin, A., et al., "VoIP call over WLAN with Bluetooth headset—multiradio interoperability solutions", 2005 IEEE Application No. 12167079.8-2412—Date of Completion of Search: Jul. 13, 2012, 12 pages.
"Bluetooth Specification Version 4.0", Jun. 30, 2010, pp. 380-767.
Widmer. P., "Smart Box Software Framework", Vision Document, Apr. 7, 2003, 23 pages.
Opposition Notice and Filing in European Application No. 1 685 689 (No Translation).
Opposition Response in European Application Patent No. 1 685 689.
International Search Report for International Application No. PCT/FI2013/050085 mailed May 13, 2013.
International Search Report for International Application No. PCT/FI2012/050531—Date of Completion of Search: Sep. 3, 2012—4 pages.
European Search Report for European Patent Application No. 12166717.4-2412—dated Jul. 20, 2012.
Radio Frequency Identification RFID—A basic primer, AIM Inc. White Paper; Aug. 23, 2001; 17 pages; 1.2; The Association of the Automatic Identification and Data Capture Industry (AIM Inc.); WP-98/002R2.

* cited by examiner

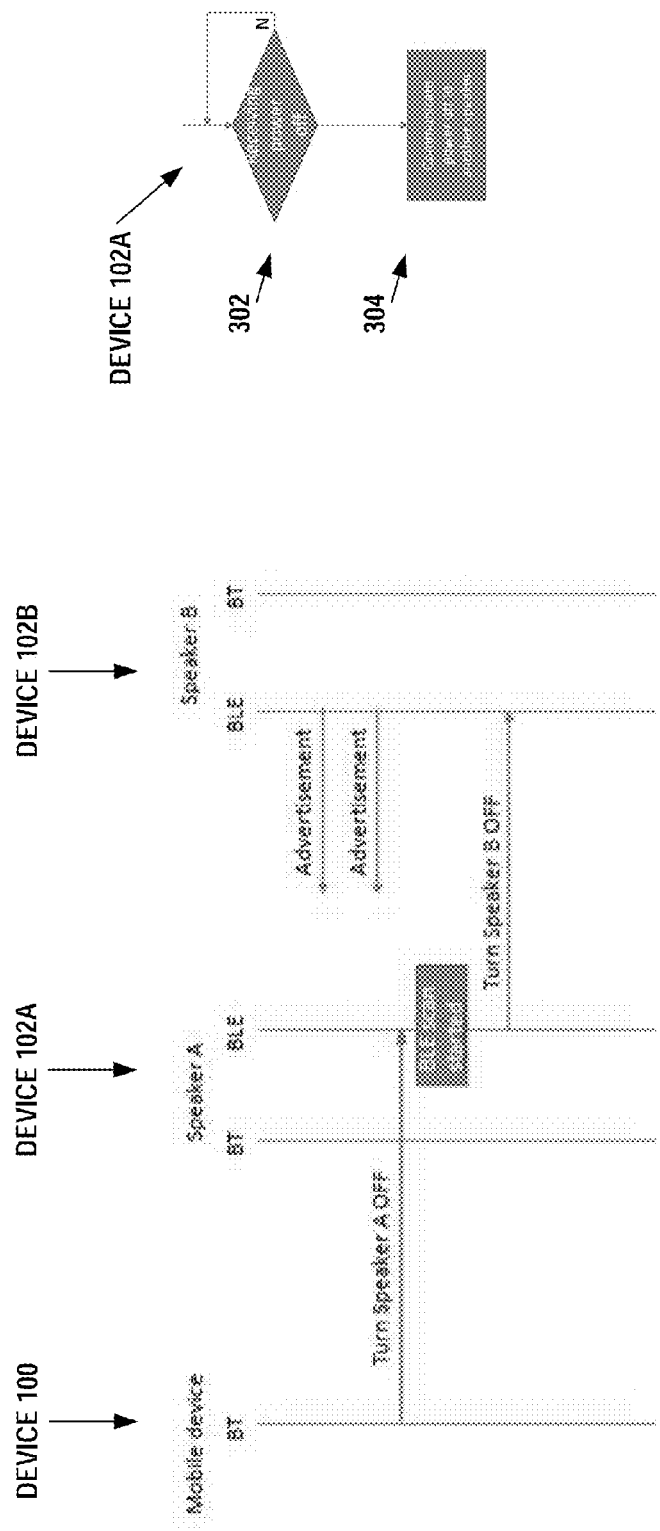

METHOD, APPARATUS, AND COMPUTER PROGRAM PRODUCT FOR MULTI-DEVICE OUTPUT MODE CONFIGURATION

FIELD

The technology field relates to setting up wireless media output devices on stereo/surround mode.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. The Bluetooth™ Core Specification, Version 4.0, Bluetooth™ SIG, Jun. 30, 2010 (incorporated herein by reference), describes the Bluetooth™ protocol (BT) and the Bluetooth™ Low Energy protocol (BTLE).

SUMMARY

Method, apparatus, and computer program product example embodiments enhance setting up wireless media output devices on stereo/surround mode.

An example embodiment of the invention includes a method comprising:

receiving, by an apparatus, streaming content over a first wireless carrier, from a source device;

discovering, by the apparatus, wireless messages over a second wireless carrier, associated with presence of a wireless device capable of receiving streaming content over the first wireless carrier and capable of reproducing at least a portion of the received streaming content;

determining, by the apparatus, that wireless messages received from another wireless device over the second wireless carrier, indicate a wireless device capable of receiving streaming content over the first wireless carrier and capable of reproducing at least a portion of the received streaming content; and activating, by the apparatus, over the second wireless carrier, a wireless connection with the other wireless device over the first wireless carrier, and forwarding the streaming content over the wireless connection to the other wireless device.

An example embodiment of the invention includes a method comprising:

measuring, by the apparatus, signal strength of the wireless messages received from the other wireless device over the second wireless carrier, to determine proximity of the other wireless device; and activating, by the apparatus, the wireless connection with the other wireless device over the first wireless carrier, if the measured signal strength of the wireless messages received from the other wireless device is greater than a predefined threshold value.

An example embodiment of the invention includes a method comprising:

measuring, by the apparatus, an angle-of-arrival of the wireless messages received from the other wireless device over the second wireless carrier, to determine a location of the other wireless device; and transmitting, by the apparatus, to the other wireless device, an indication of a stereo channel to be reproduced from the streaming content received over the first wireless carrier by the other wireless device, based on the measured angle-of-arrival.

An example embodiment of the invention includes a method comprising:

receiving, by the apparatus, a power-off indication over the first wireless carrier, from the source device;

transmitting, by the apparatus, over the second wireless carrier, a power-off indication to the other wireless device; and resuming discovering, by the apparatus, wireless messages over the second wireless carrier, associated with presence of a wireless device capable of receiving streaming content over the first wireless carrier and capable of reproducing at least a portion of the received streaming content.

An example embodiment of the invention includes a method comprising:

transmitting, by the apparatus, wireless messages over a second wireless carrier, indicating the apparatus is a wireless device capable of receiving streaming content over a first wireless carrier and is capable of reproducing at least a portion of the received streaming content;

receiving, by the apparatus, from another wireless device over the second wireless carrier, a response to the wireless messages, to activate a wireless connection with the other wireless device over the first wireless carrier; and receiving streaming content via the wireless connection from the other wireless device.

An example embodiment of the invention includes a method comprising:

inserting, by the apparatus, angle-of-arrival data relevant to angle-of-arrival direction finding, in the wireless messages transmitted over the second wireless carrier; and receiving, by the apparatus, from the other wireless device, an indication of a stereo channel to be reproduced from the streaming content received by the apparatus over the first wireless carrier, based on a measured angle-of-arrival.

An example embodiment of the invention includes a method comprising:

reproducing, by the apparatus, at least one channel from the streaming content received by the apparatus over the first wireless carrier;

receiving, by the apparatus, over the second wireless carrier, a power-off indication from the other wireless device; and turning off, by the apparatus, reproduction of the at least one channel from the streaming content received by the apparatus over the first wireless carrier.

An example embodiment of the invention includes an apparatus comprising:

at least one processor;

at least one memory including computer program code;

the at least one memory and the computer program code configured to, with the at least one processor, cause the apparatus at least to:

receive streaming content over a first wireless carrier, from a source device;

discover wireless messages over a second wireless carrier, associated with presence of a wireless device capable of receiving streaming content over the first wireless carrier and capable of reproducing at least a portion of the received streaming content;

determine that wireless messages received from another wireless device over the second wireless carrier, indicate a wireless device capable of receiving streaming content over the first wireless carrier and capable of reproducing at least a portion of the received streaming content; and activate over the second wireless carrier, a wireless connection with the other wireless device over the first wireless carrier, and forward the streaming content over the wireless connection to the other wireless device.

An example embodiment of the invention includes an apparatus comprising:

the at least one memory and the computer program code configured to, with the at least one processor, cause the apparatus at least to:

measure signal strength of the wireless messages received from the other wireless device over the second wireless carrier, to determine proximity of the other wireless device; and activate the wireless connection with the other wireless device over the first wireless carrier, if the measured signal strength of the wireless messages received from the other wireless device is greater than a predefined threshold value.

An example embodiment of the invention includes an apparatus comprising:

the at least one memory and the computer program code configured to, with the at least one processor, cause the apparatus at least to:

measure an angle-of-arrival of the wireless messages received from the other wireless device over the second wireless carrier, to determine a location of the other wireless device; and transmit to the other wireless device, an indication of a stereo channel to be reproduced from the streaming content received over the first wireless carrier by the other wireless device, based on the measured angle-of-arrival.

An example embodiment of the invention includes an apparatus comprising:

the at least one memory and the computer program code configured to, with the at least one processor, cause the apparatus at least to:

receive a power-off indication over the first wireless carrier, from the source device;

transmit over the second wireless carrier, a power-off indication to the other wireless device; and resume discovering wireless messages over the second wireless carrier, associated with presence of a wireless device capable of receiving streaming content over the first wireless carrier and capable of reproducing at least a portion of the received streaming content.

An example embodiment of the invention includes an apparatus comprising:

at least one processor;

at least one memory including computer program code;

the at least one memory and the computer program code configured to, with the at least one processor, cause the apparatus at least to:

transmit wireless messages over a second wireless carrier, indicating the apparatus is a wireless device capable of receiving streaming content over a first wireless carrier and is capable of reproducing at least a portion of the received streaming content;

receive from another wireless device over the second wireless carrier, a response to the wireless messages, to activate a wireless connection with the other wireless device over the first wireless carrier; and receive streaming content via the wireless connection from the other wireless device.

An example embodiment of the invention includes an apparatus comprising:

the at least one memory and the computer program code configured to, with the at least one processor, cause the apparatus at least to:

insert angle-of-arrival data relevant to angle-of-arrival direction finding, in the wireless messages transmitted over the second wireless carrier; and receive from the other wireless device, an indication of a stereo channel to be reproduced from the streaming content received by the apparatus over the first wireless carrier, based on a measured angle-of-arrival.

An example embodiment of the invention includes an apparatus comprising:

the at least one memory and the computer program code configured to, with the at least one processor, cause the apparatus at least to:

reproduce at least one channel from the streaming content received by the apparatus over the first wireless carrier;

receive over the second wireless carrier, a power-off indication from the other wireless device; and turn off reproduction of the at least one channel from the streaming content received by the apparatus over the first wireless carrier.

An example embodiment of the invention includes a computer program product comprising computer executable program code recorded on a computer readable, non-transitory storage medium, the computer executable program code comprising:

code for receiving, by an apparatus, streaming content over a first wireless carrier, from a source device;

code for discovering, by the apparatus, wireless messages over a second wireless carrier, associated with presence of a wireless device capable of receiving streaming content over the first wireless carrier and capable of reproducing at least a portion of the received streaming content;

code for determining, by the apparatus, that wireless messages received from another wireless device over the second wireless carrier, indicate a wireless device capable of receiving streaming content over the first wireless carrier and capable of reproducing at least a portion of the received streaming content; and code for activating, by the apparatus, over the second wireless carrier, a wireless connection with the other wireless device over the first wireless carrier, and forwarding the streaming content over the wireless connection to the other wireless device.

An example embodiment of the invention includes a computer program product comprising:

code for measuring, by the apparatus, signal strength of the wireless messages received from the other wireless device over the second wireless carrier, to determine proximity of the other wireless device; and code for activating, by the apparatus, the wireless connection with the other wireless device over the first wireless carrier, if the measured signal strength of the wireless messages received from the other wireless device is greater than a predefined threshold value.

An example embodiment of the invention includes a computer program product comprising:

code for measuring, by the apparatus, an angle-of-arrival of the wireless messages received from the other wireless device over the second wireless carrier, to determine a location of the other wireless device; and code for transmitting, by the apparatus, to the other wireless device, an indication of a stereo channel to be reproduced from the streaming content received over the first wireless carrier by the other wireless device, based on the measured angle-of-arrival.

An example embodiment of the invention includes a computer program product comprising:

code for receiving, by the apparatus, a power-off indication over the first wireless carrier, from the source device;

code for transmitting, by the apparatus, over the second wireless carrier, a power-off indication to the other wireless device; and code for resuming discovering, by the apparatus, wireless messages over the second wireless carrier, associated with presence of a wireless device capable of receiving streaming content over the first wireless carrier and capable of reproducing at least a portion of the received streaming content.

An example embodiment of the invention includes a computer program product comprising computer executable program code recorded on a computer readable, non-transitory storage medium, the computer executable program code comprising:

code for transmitting, by the apparatus, wireless messages over a second wireless carrier, indicating the apparatus is a wireless device capable of receiving streaming content over a first wireless carrier and is capable of reproducing at least a portion of the received streaming content;

code for receiving, by the apparatus, from another wireless device over the second wireless carrier, a response to the wireless messages, to activate a wireless connection with the other wireless device over the first wireless carrier; and code for receiving streaming content via the wireless connection from the other wireless device.

An example embodiment of the invention includes a computer program product comprising:

code for inserting, by the apparatus, angle-of-arrival data relevant to angle-of-arrival direction finding, in the wireless messages transmitted over the second wireless carrier; and code for receiving, by the apparatus, from the other wireless device, an indication of a stereo channel to be reproduced from the streaming content received by the apparatus over the first wireless carrier, based on a measured angle-of-arrival.

An example embodiment of the invention includes a computer program product comprising:

code for reproducing, by the apparatus, at least one channel from the streaming content received by the apparatus over the first wireless carrier;

code for receiving, by the apparatus, over the second wireless carrier, a power-off indication from the other wireless device; and code for turning off, by the apparatus, reproduction of the at least one channel from the streaming content received by the apparatus over the first wireless carrier.

The resulting example embodiments enhance setting up wireless media output devices on stereo/surround mode.

The second multimedia device is shown periodically transmitting Bluetooth™ Low Energy protocol (BTLE) advertising messages containing a description of the capabilities of the second multimedia device and containing angle-of-arrival (AoA) data, in accordance with at least one embodiment of the present invention.

Figure 1A:
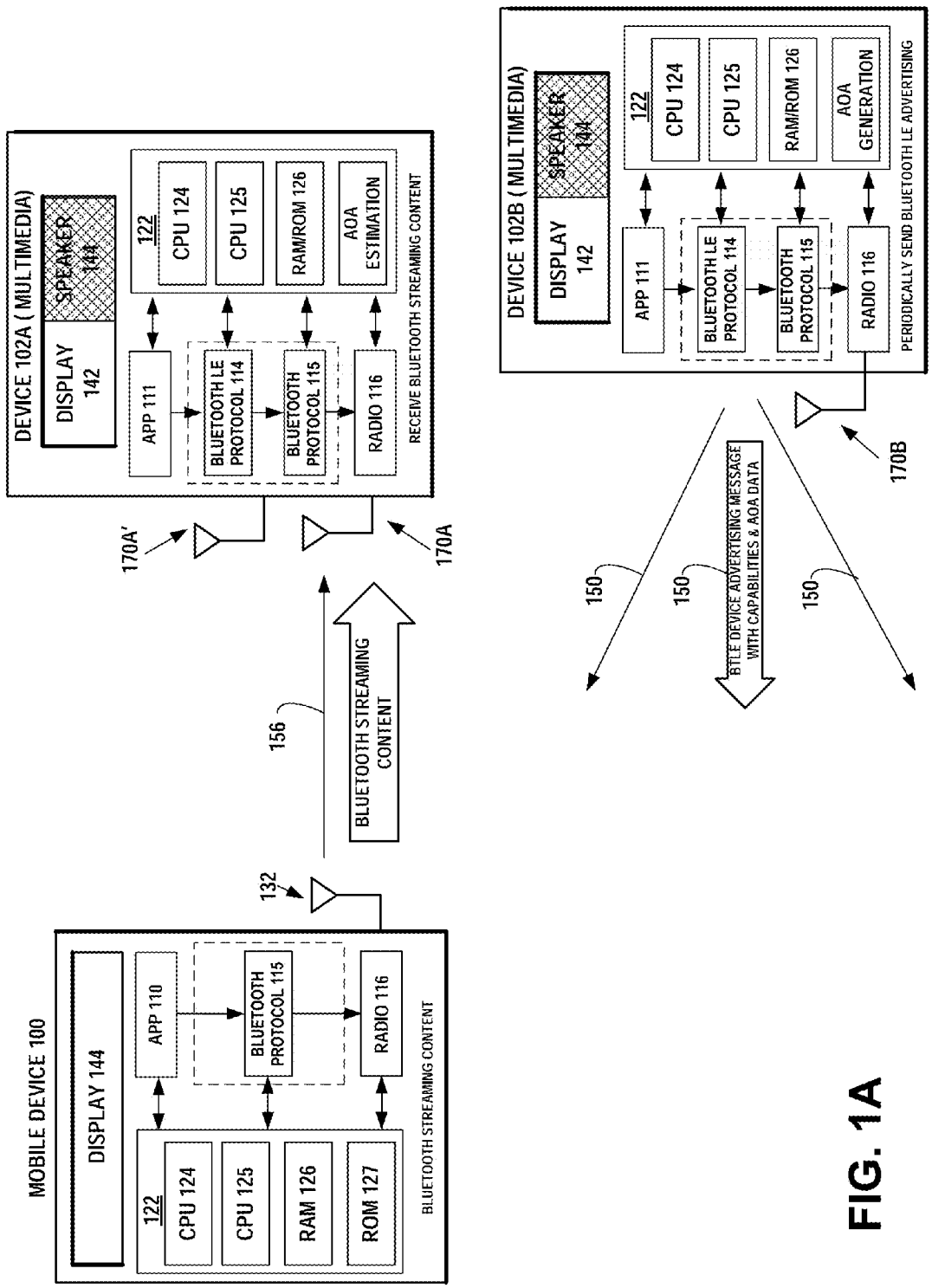
FIG. 1A is an illustration of an example embodiment of a network with at least two multimedia devices, such as audio speakers and/or video displays A and B, a mobile wireless device. A multimedia device includes, in accordance with at least one example embodiment, at least an individual audio speaker or display device. The mobile wireless device is shown streaming multimedia content, such as two stereo audio channels of music, transmitted over a Bluetooth™ protocol (BT) connection to a first one of the multimedia devices.
Figure 1B:
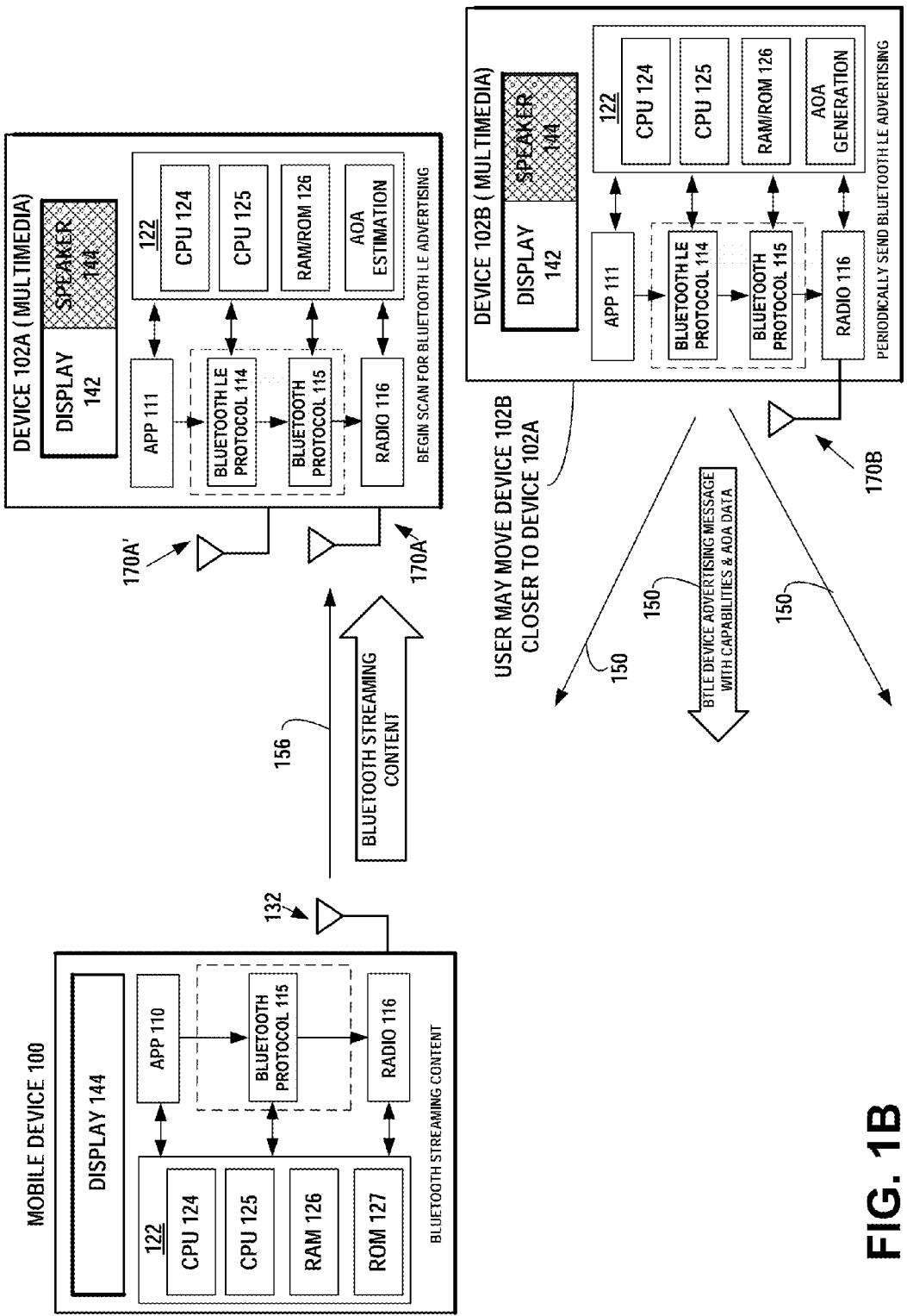

FIG. 1B is an illustration of an example embodiment of the network of FIG. 1A, wherein the first multimedia device begins discovering Bluetooth™ Low Energy protocol (BTLE) advertising messages containing a description of a wireless device having multimedia device capabilities for receiving streaming multimedia content, such as two stereo audio channels of music, transmitted over a Bluetooth™ protocol (BT) connection. The user may move the second multimedia device closer to the first multimedia device, to increase the probability of the first multimedia device discovering the second multimedia device, in accordance with at least one embodiment of the present invention.

Figure 1C:
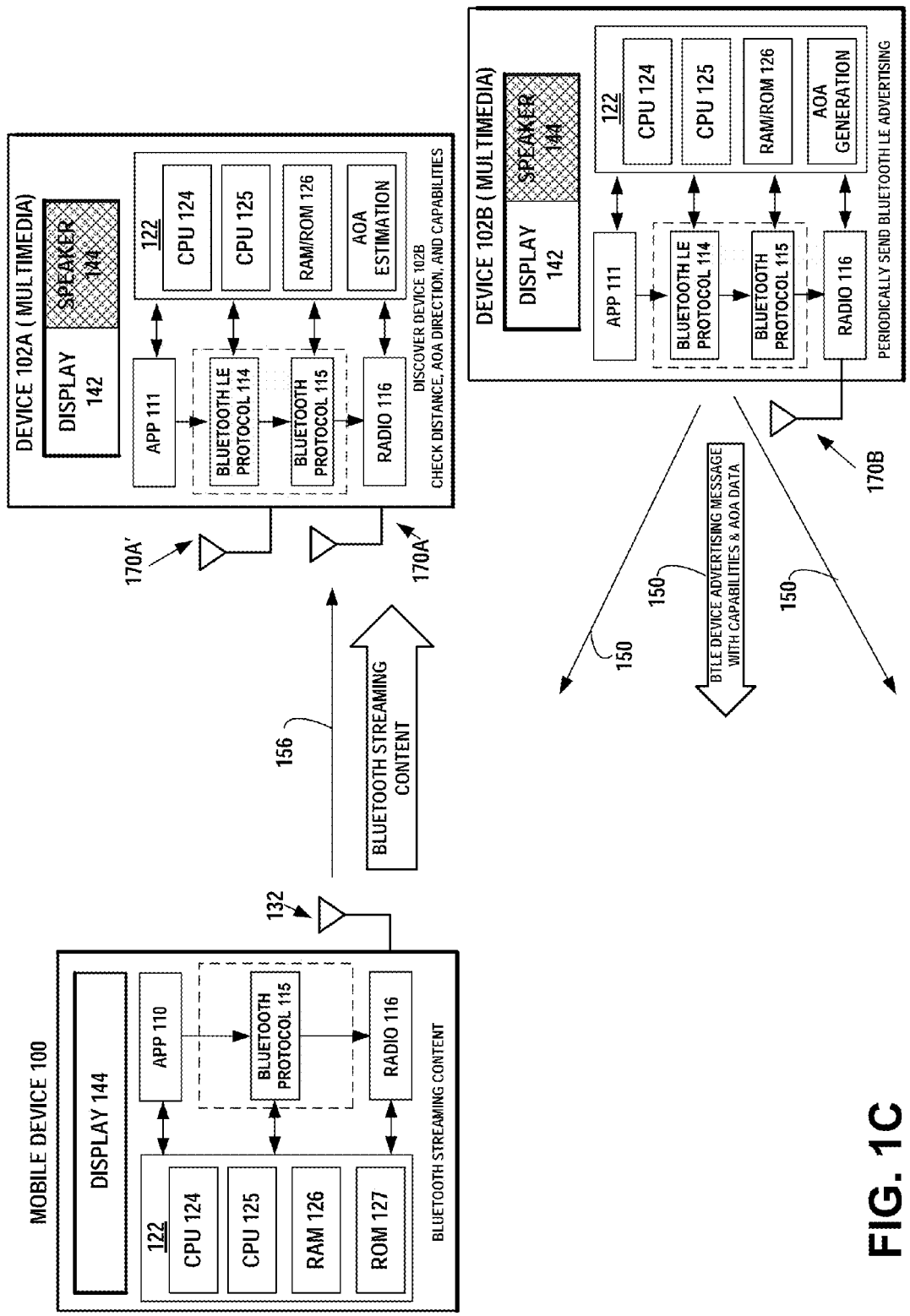

FIG. 1C is an illustration of an example embodiment of the network of FIG. 1B, wherein the first multimedia device receives the Bluetooth™ Low Energy protocol (BTLE) advertising messages from the second multimedia device, containing the description of the capabilities of the second multimedia device, for receiving streaming multimedia content over a Bluetooth™ protocol (BT) connection. The first multimedia device measures a signal strength characteristic RSSI of the received Bluetooth™ Low Energy protocol (BTLE) advertising messages to determine the proximity of the second multimedia device. The first multimedia device makes an angle-of-arrival (AoA) estimation of the received advertising message by sampling the angle-of-arrival (AoA) data in the received advertising messages, in accordance with at least one embodiment of the present invention.

Figure 1D:
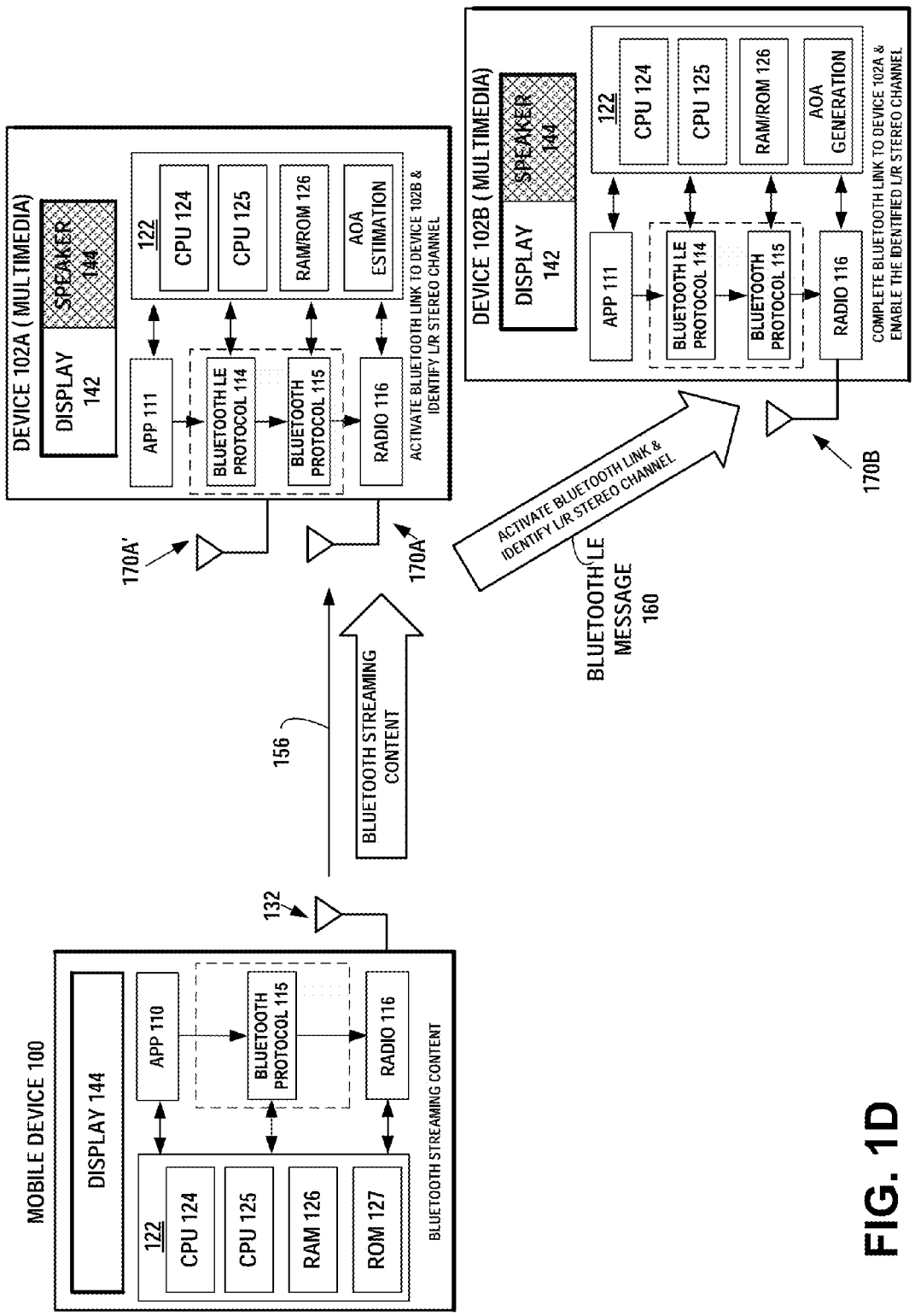

FIG. 1D is an illustration of an example embodiment of the network of FIG. 1C, wherein the first multimedia device transmits to the second multimedia device, a Bluetooth™ Low Energy protocol (BTLE) message to activate a Bluetooth™ protocol (BT) connection or link for the purpose of streaming multimedia content from the first multimedia device to the second multimedia device. The first multimedia device also transmits instructions to the second multimedia device, to play either the left or the right stereo channel, based on the angle-of-arrival (AoA) estimation made by the first multimedia device, in accordance with at least one embodiment of the present invention.

Figure 1E:
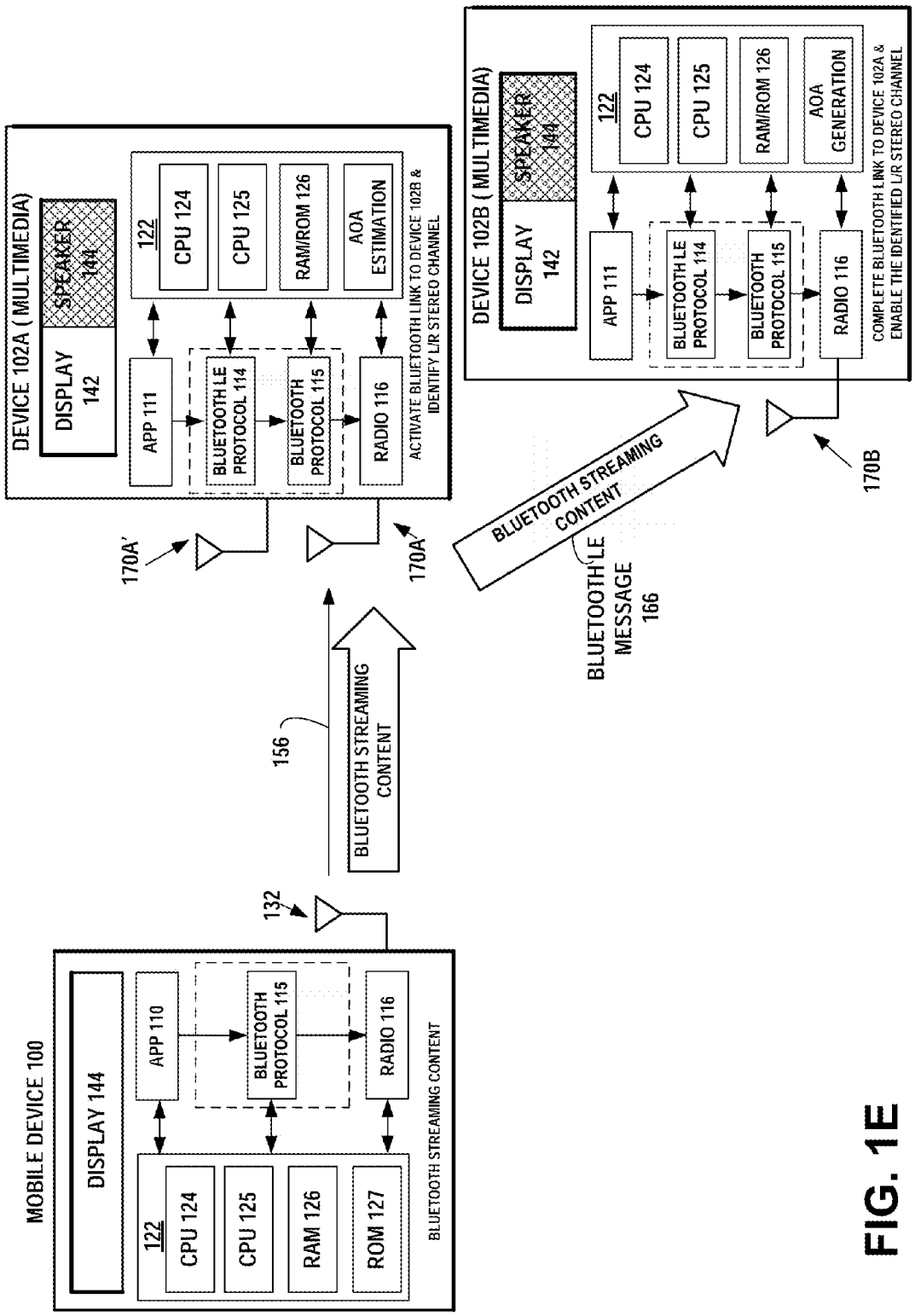

FIG. 1E is an illustration of an example embodiment of the network of FIG. 1D, wherein the first multimedia device is shown forwarding the streaming multimedia content over the Bluetooth™ protocol (BT) connection to the second multimedia device. The second multimedia device play either the left or the right stereo channel, as instructed by the first multimedia device, in accordance with at least one embodiment of the present invention.

Figures 2A, 2B:
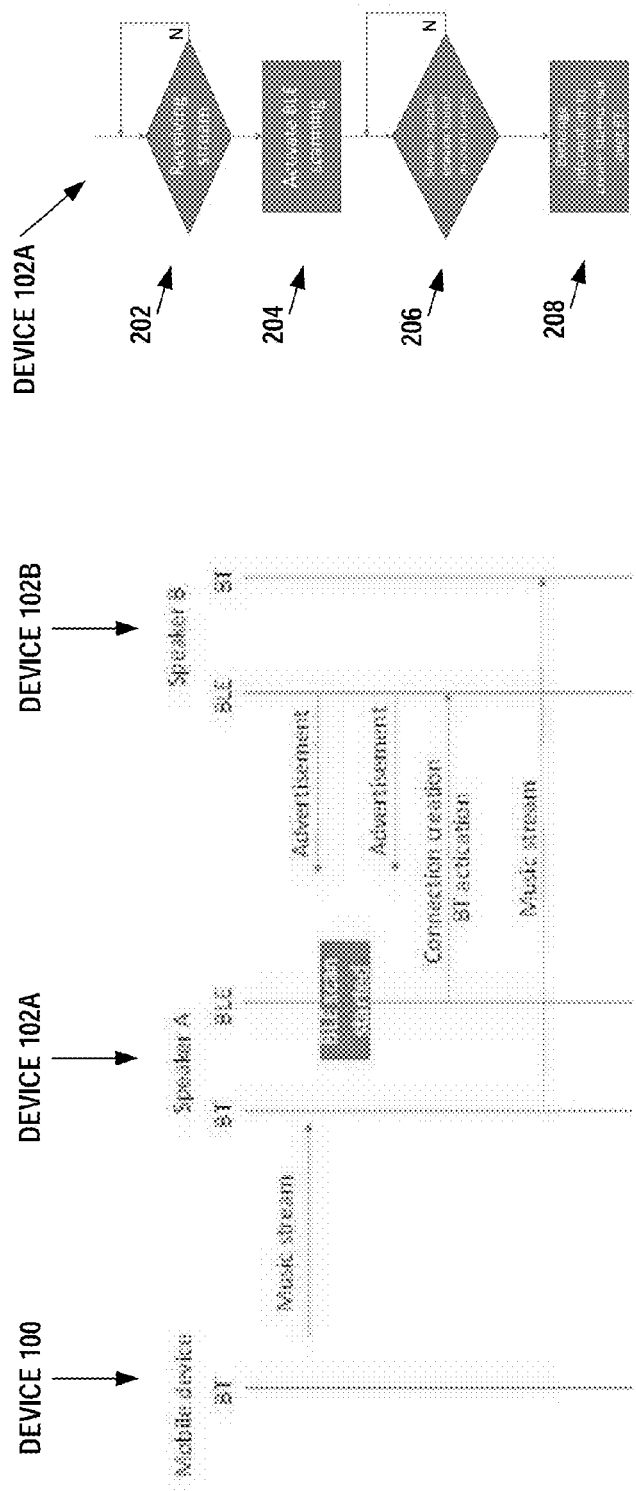

FIG. 2A is an illustration of an example sequence diagram for the operations of the mobile wireless device and the first and second multimedia devices in FIGS. 1A to 1E, in accordance with at least one embodiment of the present invention.

FIG. 2B is an illustration of an example flow diagram for the steps performed of the first multimedia device in FIGS. 1A to 1E, in accordance with at least one embodiment of the present invention.

FIG. 3A is an illustration of an example sequence diagram for turning off the first and second multimedia devices, in accordance with at least one embodiment of the present invention.

FIG. 3B is an illustration of an example flow diagram for the steps performed of the first multimedia device in turning off the second multimedia device, in accordance with at least one embodiment of the present invention.

Figure 4:
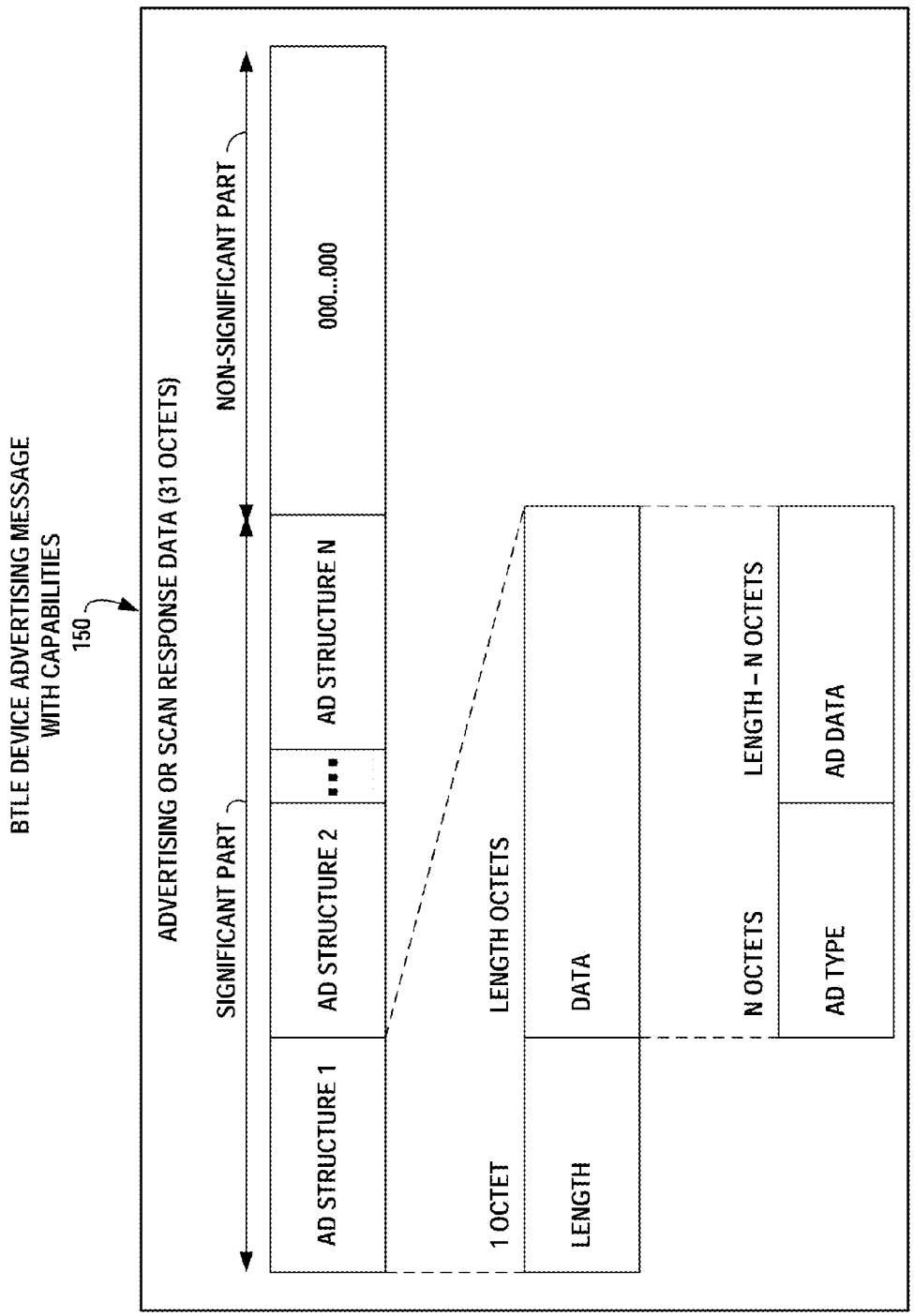

FIG. 4 is an illustration of an example format for the Bluetooth™ Low Energy protocol (BTLE) advertising messages, in accordance with at least one embodiment of the present invention.

Figure 5:
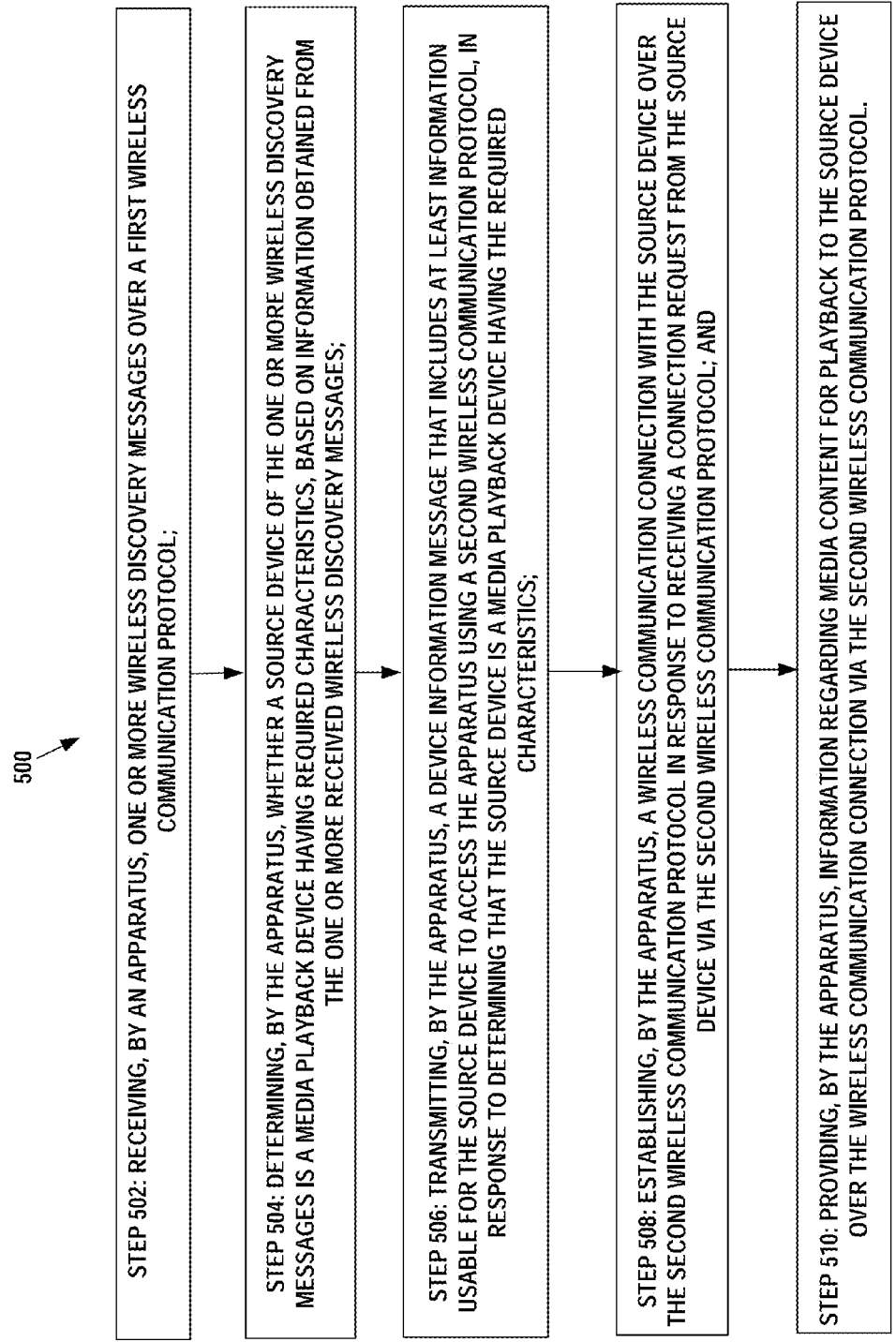
Figure 5A:
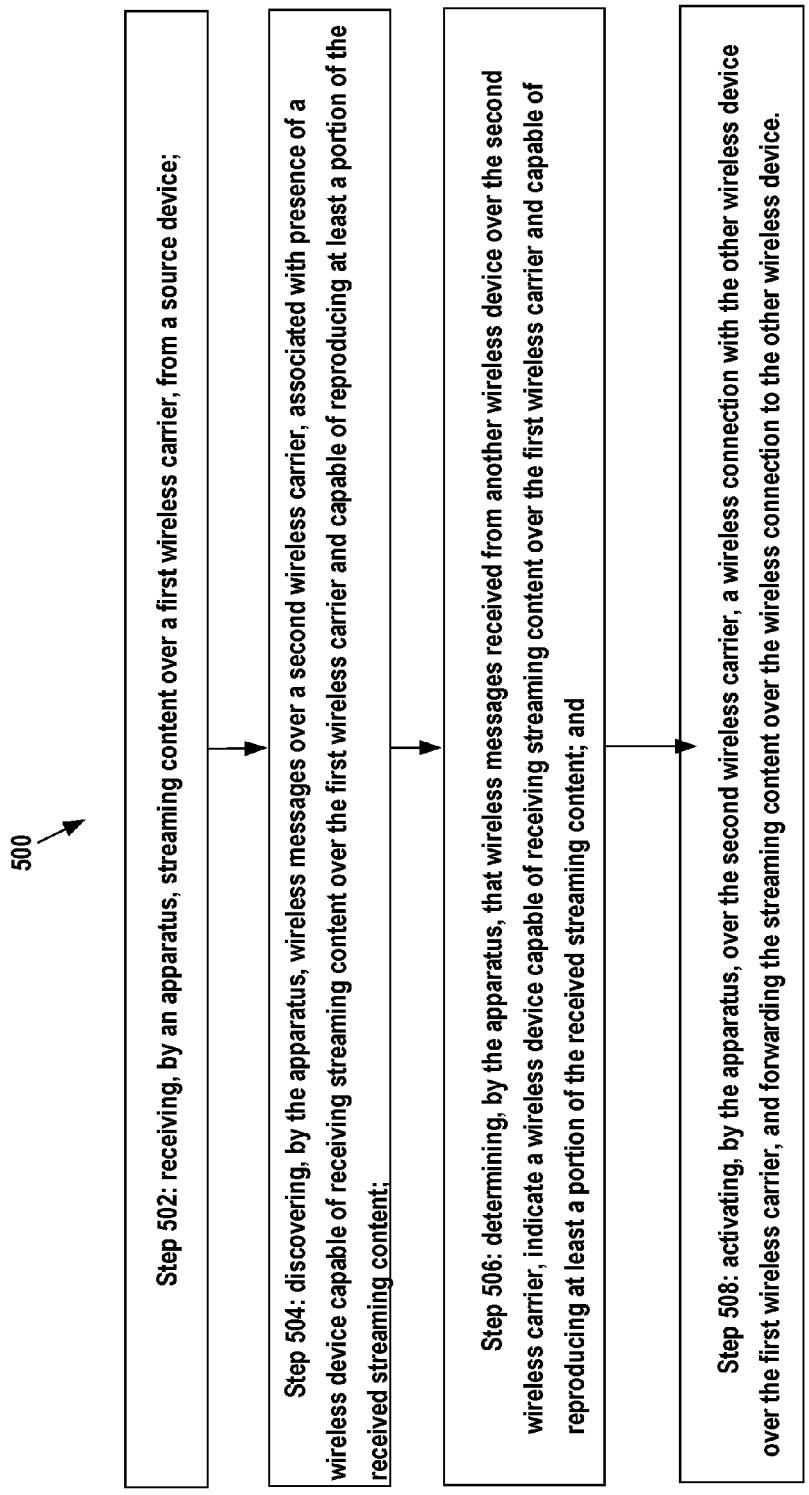

FIG. 5A is an illustration of an example flow diagram of an example process in the first wireless multimedia device, carrying out the example operations, in accordance with at least one embodiment of the present invention.

Figure 5B:
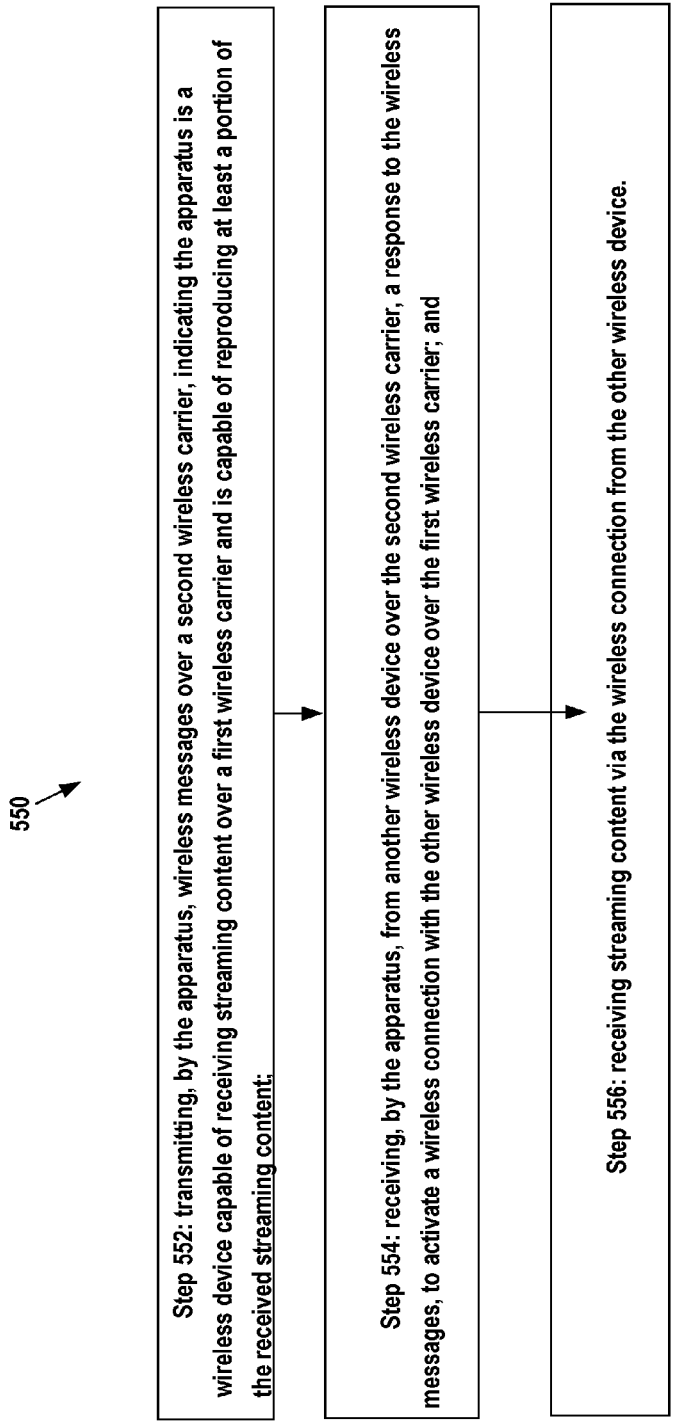

FIG. 5B is an illustration of an example flow diagram of an example process in the second wireless multimedia device, carrying out the example operations, in accordance with at least one embodiment of the present invention.

Figure 6:
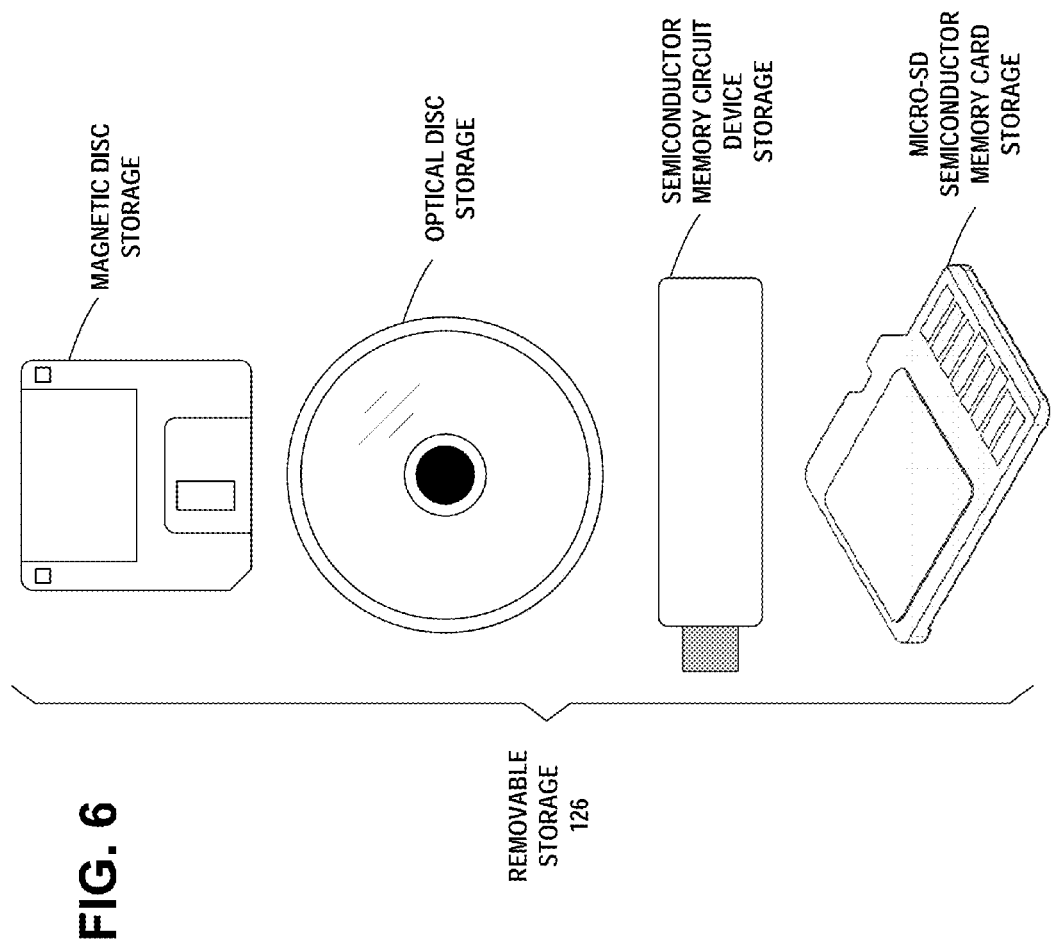

FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

DISCUSSION OF EXAMPLE EMBODIMENTS OF THE INVENTION

This section is organized into the following topics:
A. Wireless Short-Range Communication Networks
B. Connection Formation Between Bluetooth™ Devices
C. Touch-to-Select in Bluetooth™ Technology
D. Bluetooth™ Low Energy (LE) Technology
E. Direction Estimation
F. Multi-Device Output Mode Configuration A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), IEEE 802.15.4, and near field communication technologies, such as radio frequency identification (RFID) and near field communication (NFC) technology that enable contactless identification and interconnection of wireless devices. Bluetooth Technology provides an example of wireless short-range communication establishment.

B. Connection Formation Between Bluetooth™ Devices

A procedure for forming connections between Bluetooth™ devices is described in the Bluetooth™ Specification, Version 4, Jun. 30, 2010. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation may include inquiry, inquiry scanning, inquiry response, in addition to paging, page scanning, and page response procedures.

1. Inquiry

Inquiry is a procedure where a Bluetooth™ device transmits inquiry messages and listens for responses in order to discover the other Bluetooth™ devices that are within the coverage area and set discoverable. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over 79 physical channels. An inquiring device wanting to discover other devices repetitively probes a first set of 16 frequencies, probing two frequencies every 1250 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device broadcasts inquiry packets on these 32 carrier frequencies.

During the inquiry procedure, the inquiring device or master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. During the inquiry substate, the discovering device collects the Bluetooth™ device addresses of all devices that respond to the inquiry message. In addition, the discovering device may also collect extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and 63 values have been reserved as dedicated inquiry access codes (DIAC) that only inquire for a certain type of device. The inquiry access codes are derived from reserved Bluetooth™ device addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels changes the inquiry channel every 1.28 s until it receives an inquiry message on the current channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's device access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval shall be less than or equal to 2.56 s.

2. Inquiry Response

An inquiry response packet (frequency hop synchronization (FHS)) is transmitted from the inquiry scanning device or slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1003, however, for scanning intervals less than 1.28 s MAX_RAND may be as small as 127. A profile that uses a DIAC may choose to use a smaller MAX_RAND than 1003 even when the scanning interval is greater than or equal to 1.28 s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ device address, native clock and other slave information. This FHS packet is returned at times that tend to be random. If the slave has non-zero extended inquiry response data to send it will return an FHS packet with the EIR bit set to one to the master 625 us after the inquiry message was received. It then returns an extended inquiry response packet 1250 us after the start of the FHS packet. FHS is always returned 625 us after inquiry message was received. But, consecutive FHS packets are returned according to this random process. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

The retransmission of the inquiry response can be received by the inquiring devices within roughly 80 or 640 ms depending on inquiry scan interval of the discovered device. The random backoff for devices using scanning interval <1.28 s is from 0 to 79,375 ms and for other devices from 0 to 639,375 ms. The device using the default inquiry interval is using the latter value range.

In order to collect responses from all devices in the range in an error-free environment, the inquiry substate may have to last for 10.24 s unless the inquirer collects enough responses and aborts the inquiry substate earlier. If desired, the inquirer may also prolong the inquiry substate to increase the probability of receiving all responses in an error-prone environment. In consequence of long inquiry state compared to relatively short backoff times, multiple responses may be received from the single device.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) packet with type DM1, DM3, DM5, DH1, DH3 or DH5. To minimize interference it is recommended to use the shortest packet that is capable of containing the data. The packet is sent on the same frequency as the FHS packet, 1250 microseconds after the start of the FHS packet. In the packet header, LT_ADDR may be set to zero. TYPE may be one of DM1, DM3, DM5, DH1, DH3 or DH5. FLOW, ARQN and SEQN may all be set to zero and ignored during receipt. The HEC LFSR may be initialized with the same DCI (default check initialization) as for the FHS packet. In the payload header, LLID may contain the value 10 (start of an L2CAP message or no fragmentation). FLOW may be set to zero and ignored upon receipt. The length of the payload body (LENGTH) may be smaller than or equal to 240 bytes. The CRC LFSR may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all IACs.

4. Page

Page is the initial phase of the connection procedure where a device transmits a train of page messages until a response is received from the target device, stopped by the host or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ device address of the slave device. The necessary information may be received by other means, such as Out-Of-Band pairing. Also the page is not always preceded with inquiry, because the address may be known beforehand (for example saved from previous connections). In the paging procedure, the Bluetooth™ device that will become the master carries out a page procedure by transmitting page messages in connection request packets to the specified Bluetooth™ slave device that carries out a page scanning procedure to listen for connection request packets from the paging device. A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's Bluetooth™ device address BD_ADDR to identify communications on the channel. The page scan channel uses a slower hopping rate than the hop rate of the paging device, using the Bluetooth™ device clock of the scanning device as an input. A device listening on its page scan channel remains passive until it receives a page request from another Bluetooth™ device, identified by the page scan channel access code. The two devices will then follow the page procedure to form a connection where the paging device is the master and the page scan device is the slave in a piconet. In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

5. Bluetooth™ RSSI

The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy may be +/−6 dBm or better.

RSSI Monitoring of Inquiry Response and Extended Inquiry Response Packets

During Bluetooth discovery, before a connection is created, the RSSI is measured from Inquiry Response (FHS) packets when it is received by an inquiring device if enabled by the host.

When the controller receives an Inquiry Response (FHS) without following an Extended Inquiry Response, an HCI Inquiry Result with RSSI event is sent by the controller to the host application, which indicates that a remote Bluetooth device has responded during the current Inquiry process. This event will be sent from the Controller to the Host as soon as an Inquiry Response from a remote device is received. The RSSI parameter is measured during the FHS packet returned by each responding slave.

When the controller receives an Inquiry Response (FHS) following with an Extended Inquiry Response, an HCI Extended Inquiry Result event is sent by the controller to the host application, which indicates that a remote Bluetooth device has responded during the current inquiry process with extended inquiry response data. This event will be sent from the Controller to the Host upon reception of an Extended Inquiry Response from a remote device. One single Extended Inquiry Response is returned per event. This event contains RSSI and inquiry response data for the remote device that responded to the latest inquiry. The RSSI parameter is measured during the FHS packet returned by each responding slave.

RSSI Monitoring of Data Packets Received Over a Connection

After the discovery phase is completed, once a Bluetooth device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

Measuring Pathloss with the RSSI and the TX Power Level

The TX Power Level data field in the Extended Inquiry Response packet indicates the transmitted power level of the FHS and EIR packets at the transmitter of the sending device. The TX Power Level data field may be used to calculate path loss of a received packet when the receiving device measures the RSSI of the received FHS packet, using the following equation:

$$pathloss = Tx \text{ Power Level} - RSSI \text{ of the inquiry response packet}$$

For example, if Tx Power Level=+4 (dBm) and the RSSI on the inquiry response packet is −60 (dBm) then the total pathloss is +4−(−60)=+64 dB. If a second inquiry response packet were received at −40 dBm with a Tx Power Level data =+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple inquiry response packets are received from the same device.

6. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands And Events

The device discovery group of commands and events allow a device to discover other devices in the surrounding area. The host controller interface includes the standard HCI Inquiry Result Event logic and HCI Extended Inquiry Result Event logic that recognizes the receipt of the FHS packet and the following EIR packet, respectively. Some of the HCI commands and events for device discovery are described as follows:

Inquiry Command

The HCI Inquiry command will cause the Bluetooth Controller to enter Inquiry Mode to transmit inquiry packets used to discover other nearby Bluetooth devices.

Inquiry Result Event

HCI Inquiry Result Event: The inquiry result event indicates that a remote device has responded with an inquiry response (IR), i.e. with an FHS packet, during the current inquiry process. This event will be sent from the Bluetooth™ Controller to the Host as soon as an Inquiry Response from a remote device is received. The event parameters in the HCI inquiry result event include BD_ADDR and Class_of_Device of the remote responding device and Clock_Offset OFFSET(A,B) between the responding device and the inquiring device.

Inquiry Result with RSSI Event

The Inquiry Result with RSSI event indicates that a remote Bluetooth device has responded with an inquiry response (FHS) packet during the current Inquiry process. The event reported to the host includes the BD_ADDR address for the device that responded, the Class of Device for the device, the clock offset between the responding device and the receiving device, and the measured RSSI of the received inquiry response packet in units of dBm. This is similar to the inquiry result event, but it includes the RSSI value calculated by the controller.

Extended Inquiry Result Event

HCI Extended Inquiry Result Event:

The extended inquiry result event indicates that another Bluetooth™ device has responded during the current inquiry process with extended inquiry response data. Data received in this event will be sent from the device's Controller to the Host upon reception of an EIR from a remote device. One single extended inquiry response is returned per event. The event reported to the host includes the received signal strength indication (RSSI) measurement and inquiry response data for the device that responded to the latest inquiry. The RSSI parameter is measured during the FHS packet returned by each responding device. If an extended inquiry response packet from the same remote device is correctly received in a later response, another event is generated. The Extended Inquiry Response data fields are not interpreted by the controller. The standard HCI Extended Inquiry Result Event logic performs the HCI extended inquiry result event procedure to extract the data from the received extended inquiry response packet and to send this data to the host application. The received EIR data extracted from the packet may be passed unaltered to the host application.

Read Inquiry Response Transmit Power Level Command

This command will read the inquiry response Transmit Power level data, expressed in a field of the EIR packet, indicating the power that was used to transmit the FHS and EIR data packets during the discovery phase.

HCI Write Extended Inquiry Response Command

The Write Extended Inquiry Response command writes the extended inquiry response to be sent to an inquiring device during the extended inquiry response procedure. The write extended inquiry response command will write the data that the device's host wishes to send in the extended inquiry response packet during inquiry response. The FEC_Required command parameter states if forward error correction (FEC) encoding is required. The initial value of the inquiry response data is all zero octets. The controller does not interpret the extended inquiry response data, but passes it on to the baseband medium access control and physical radio for transmission in an EIR packet.

Write Inquiry Transmit Power Level Command

The Write Inquiry Transmit Power Level command is used by the transmitting device to write the transmit power level used to transmit the inquiry data packets.

Connection Phase HCI Commands and Events

Read RSSI Command

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For a Basic Rate/Enhanced Data Rate (BR/EDR) Controller, a Connection_Handle is used as the Handle command parameter and return parameter. The RSSI parameter returns the difference between the measured Received Signal Strength Indication (RSSI) and the limits of the Golden Receive Power Range for a Connection_Handle to another BR/EDR Controller. The Connection_Handle must be a Connection_Handle for an ACL connection. Any positive RSSI value returned by the Controller indicates how many dB the RSSI is above the upper limit, any negative value indicates how many dB the RSSI is below the lower limit. The value zero indicates that the RSSI is inside the 20 dB-wide Golden Receive Power Range. The accuracy of the dB values will depend on the Bluetooth hardware. The only requirements for the hardware are that the BR/EDR Controller is able to tell whether the RSSI is inside, above or below the Golden Device Power Range. The RSSI measurement compares the received signal power with two threshold levels, which define the Golden Receive Power Range. The lower threshold level corresponds to a received power between −56 dBm and 6 dB above the actual sensitivity of the receiver. The upper threshold level is 20 dB above the lower threshold level to an accuracy of +/−6 dB. The meaning of the RSSI metric is an absolute receiver signal strength value in dBm to ±6 dBm accuracy. If the RSSI cannot be read, the RSSI metric is set to 127. (When the Read_RSSI command has completed, a Command Complete event is generated.)

Read Transmit Power Level Command

The Read Transmit Power Level command will read the values for the Transmit Power Level parameter for the specified Connection_Handle for data communication packets during the connection phase, in a range of −30 to +20 dBm.

C. Touch-to-Select in Bluetooth™ Technology

The Bluetooth™ Touch-to-select feature employs Received Signal Strength Indication (RSSI) information calculated from the FHS packet, which is used in determining that an inquiry scanning device is within "touch range", i.e. proximate or in close proximity of the inquiring device, and when a threshold for that close proximity is met. This may provide an "intent to share" or "touch to connect" feature.

The inquiring device may measure the signal strength (e.g., RSSI) of each response message from an inquiry scanning device, which may be used in ordering the responding devices. In this manner, the inquiry scanning device with the highest measured signal strength is listed first (e.g., wherein the measured signal strength may correlate to the distance between the inquiring device and the responding inquiry scanning device).

An inquiry scanning device receiving inquiry packets from an inquiring device may respond by transmitting an inquiry response FHS packet or an FHS packet followed by an EIR packet. The host in the inquiring device may recognize EIR events triggered by the responses. The reported EIR events may include RSSI measurement values made by the inquiring device on the received FHS packets. From the RSSI values, the host in the inquiring device may detect when an inquiry scanning device is most likely within "touching range", that is within a distance from the inquiring device that indicates touching-related operations may be executed.

It may also be possible to determine when an inquiry scanning device is moving closer to an inquiring device. The Bluetooth™ controller in the inquiring device may report the receipt of FHS and/or EIR inquiry responses to its host software stack as an HCI Inquiry Event that may contain the measurement of the RSSI performed on the received response. In instances where EIR responses are received, the Bluetooth controller in the inquiring device may report each received EIR as an HCI Extended Inquiry Result Event. When an inquiry scanning device moves closer to an inquiring device, the Bluetooth controller in the inquiring device may report an RSSI for each inquiry response, thereby enabling the inquiring device to track the changing RSSI levels of the scanning device and thus its relative movement. When the measured RSSI satisfies predetermined response criteria (e.g., including the RSSI being measured to be at or above a predetermined level), the corresponding scanning device may be selected for touch-related operations (e.g., expedited connection establishment).

The Bluetooth™ controller in an inquiring device reports the receipt of inquiry responses to its host, which also has Touch selection software running Typical response criteria may include RSSI values measured on the responses, being sensed above certain fixed threshold value, such as −30 dBm. Sensing a response packet having an RSSI of −30 dBm will then cause the Touch selection software in the inquiring device to trigger device selection, while an RSSI of −31 dBm will not. It may also be possible that responding inquiry scanning devices may send Tx power information in EIR packet, since this is an existing feature in the Bluetooth specification v4.0. In instances where Tx power information about the inquiry scanning device is available in the EIR packet, the predetermined response criteria may include an adjustable RSSI threshold value that accounts for variations in the Tx power. For example, the threshold value may be set at 30 dBm below the EIR Tx power, so that if the Tx power level in an FHS packet is +20 dBm then the threshold value that will trigger selection may be the FHS packet being measured at −10 dBm, or 30 dBm below of Tx power level. Secondly, to ensure that devices are maintained in close proximity, the predetermined response criteria may require that more than one EIR must have a sensed RSSI at or above a threshold value. In addition different thresholds may be used for different phases, for example, first the threshold value may be set above −45 dBm to select one or more candidate devices and then a second, more decisive threshold value may be set above −30 dBm.

The detected RSSI may also be a function of: [1] antenna location of the inquiry scanning device sending the signal and [2] antenna location of the inquiring device sensing the signal. The results may be improved if the antennas were brought into close proximity, which may require moving away from obstructions and changing the orientation of one or both devices.

D. Bluetooth™ Low Energy (LE) Technology

The Bluetooth™ Core Specification, Version 4.0 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, separated by 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 10 octets to a maximum of 47 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.0, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The scanner device, also referred to as the initiator device, that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.0, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth Specification V4.0, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONN_REQ" to establish a connection with that advertiser. For a scanner, it can send out a "SCAN_REQ" to ask for more information from that advertiser.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ RSSI The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and down-converted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy may be +/−6 dBm or better.

RSSI Monitoring of Bluetooth LE Packets

During Bluetooth discovery in Bluetooth LE, before a connection is created, the RSSI may be measured from advertising packets received in broadcasting channel 37, 38, or 39, when they are received by a scanning device, if enabled by the host.

When the controller receives an advertising packet, an HCI LE Advertising Report event is sent by the controller to the host application. The HCI LE Advertising Report event indicates that a Bluetooth device or multiple Bluetooth devices have been detected during an active scan or during a passive scan. The HCI LE Advertising Report event includes a parameter N that indicates the RSSI of the received packet, with N being one octet representing the magnitude of the RSSI, with a range in units of dBm of $-127 \leq N \leq +20$. This event will be sent from the Controller to the Host as soon as an advertising packet from a remote device is received. The RSSI parameter is measured during the receipt of the advertising packet. This event contains RSSI and advertising packet data for the remote device.

RSSI Monitoring of Data Packets Received Over a Connection

After the discovery phase is completed, once a Bluetooth LE device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth LE controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

Measuring Pathloss with the RSSI and the TX Power Level

The TX Power Level data field in the Bluetooth LE advertising packet indicates the transmitted power level of the advertising packets at the transmitter of the sending device. The TX Power Level is reported to the host in response to the HCI LE Read Advertising Channel Tx Power Command. The TX Power Level data field may be used to calculate path loss of a received packet when the receiving device measures the RSSI of the received advertising packet, using the following equation:

$$\text{pathloss} = \textit{Tx Power Level} - \text{RSSI of the inquiry response packet}$$

For example, if Tx Power Level=+4 (dBm) and the RSSI on the received packet is −60 (dBm) then the total pathloss is +4−(−60)=+64 dB. If a second packet were received at −40 dBm with a Tx Power Level data =+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple packets are received from the same device.

2. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core 4.0 Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands And Events

HCI LE Advertising Report Event

The Bluetooth LE device discovery group of commands and events allow a device to discover other devices in the surrounding area. The Bluetooth LE host controller interface includes the HCI LE Advertising Report event that indicates that a Bluetooth device or multiple Bluetooth devices have been detected during an active scan or during a passive scan.

Connection Phase HCI Commands and Events

HCI LE Read Advertising Channel Tx Power Command

The TX Power Level is reported to the host in response to the HCI LE Read Advertising Channel Tx Power Command. The TX Power Level data field may be used to calculate path loss of a received packet when the receiving device measures the RSSI of the received advertising packet.

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For Bluetooth LE transport, a Connection_Handle is used as the Handle command parameter and return parameter. The meaning of the RSSI metric is an absolute receiver signal strength value in dBm to ±6 dBm accuracy.

3. Bluetooth LE Proximity Profile

The Proximity Profile defines the behavior when a device moves away from a peer device so that the connection is dropped or the path loss increases above a preset level, causing an immediate alert. This alert may be used to notify the user that the devices have become separated. As a consequence of this alert, a device may take further action, for example to lock one of the devices so that it is no longer usable.

The Proximity Profile may also be used to define the behavior when the two devices come closer together such that a connection is made or the path loss decreases below a preset level.

The Proximity Profile defines two profile roles to enable devices to detect their proximity: the Proximity Reporter and the Proximity Monitor. The Proximity Reporter is a Generic Attribute Profile (GATT) server on the one device in the connection, which supports a Link Loss Service (mandatory), an Immediate Alert Service (optional), and a transmit (Tx) Power Service (optional). The Proximity Monitor is a GATT client on the peer device in the connection, which monitors the Radio Signal Strength Information (RSSI) of the connection to calculate the signal's path loss. The Proximity Monitor may use the information received from the Proximity Reporter's Tx Power Service to normalize the RSSI value, by subtracting the RSSI from the Tx Power Level. In order to trigger an alert on low RSSI, the Proximity Monitor constantly monitors RSSI.

The Proximity Monitor on one device may maintain a connection with the Proximity Reporter on the peer device and monitor the RSSI of this connection. The Proximity Monitor may calculate the path loss by subtracting the RSSI from the transmit power level of the device of the Proximity Reporter, as discovered using the Reading Tx Power procedure. If the path loss exceeds a threshold set on the Proximity Monitor, it may write in the Alert Level characteristic of the Immediate Alert service, using the GATT Write Without Response sub-procedure, to cause the Proximity Reporter to generate an alert. The Proximity Monitor may also generate an alert when the path loss exceeds the threshold. The duration of the alert may be implementation specific.

The Proximity Monitor specified in the Bluetooth Proximity Profile, may include the following functions:
Service Discovery from the peer device;
Characteristic Discovery from the peer device;
Configuration of Alert on Link Loss to the peer device;
Alert on Link Loss to the peer device;
Reading Tx Power from the peer device; and
Alert on Path Loss locally and to the peer device based on RSSI supervision.

If the path loss falls below a threshold set on the Proximity Monitor it may write in the Alert Level characteristic of the Immediate Alert service, using the GATT Write Without Response sub-procedure, to cause the Proximity Reporter to end the alert. When the path loss is below the threshold the Proximity Monitor should stop alerting.

If link loss occurs during this procedure, then the behavior defined in the Alert on Link Loss procedure may be used.

E. Direction Estimation

1. Angle-of-Arrival (AoA)

In angle-of-arrival (AoA) direction estimation, a locator wireless device includes an array of antennas arranged with a normal axis. For a linear antenna array along a linear axis of the locator device, a normal axis perpendicular to the linear axis defines a plane with the linear antenna array. A target or tag wireless device transmits a packet with a single antenna, containing AoA data relevant to angle-of-arrival direction finding. The AoA data in the packet may include a reference binary bit pattern, such as "11110000", transmitted by a single antenna of the target or tag device and received by the antenna array at the locator device. The angle-of-arrival (AoA) estimation is made at the locator wireless device by sampling the phase and amplitude of the reference bits of the AoA data.

The apparent direction of reception of a packet containing AoA data, by the linear antenna array of the locator device, as seen from a remote transmitting target or tag wireless device occupying the plane, may be represented by an observation vector. The angle between the observation vector and the normal axis is defined as the angle-of-arrival (AoA) of the signal as it approaches the antenna array of the locator device. In embodiments, the antenna array of the locator device may be arranged in a two-dimensional array in a plane and the normal axis is perpendicular to the plane of the antenna array. In this arrangement, the angle-of-arrival (AoA) is similarly defined as the angle between the observation vector and the normal axis to the plane. In embodiments, the antenna array of the locator device may be arranged in any arbitrary manner, either in a linear array, a two-dimensional array, or a three dimensional array.

F. Multi-Device Output Mode Configuration

It would be desirable to be able to automatically setup a stereo or surround sound audio or multimedia system. Currently this setup has to be done manually by the user pressing buttons in two or more stereo or surround sound speakers within a certain interval, so that each speaker can setup itself to be connected with other speakers.

In accordance with an example embodiment of the invention, the user's mobile wireless device may stream multimedia content, such as two stereo audio channels of music, transmitted over a Bluetooth™ protocol (BT) connection to a first multimedia device, such as a stereo audio speaker. For example, the speaker may be located to the left of the user. The second multimedia device, also a stereo audio speaker, is located to the right of the user. The second speaker may periodically transmit Bluetooth™ Low Energy protocol (BTLE) advertising messages containing a description of the capabilities, which may be indicated with certain service universally unique identifier (UUID), of the second speaker and containing angle-of-arrival (AoA) data relevant to angle-of-arrival direction finding.

In accordance with an example embodiment of the invention, the first speaker begins discovering Bluetooth™ Low Energy protocol (BTLE) advertising messages containing a description of a wireless device having multimedia device capabilities for receiving streaming multimedia content, such as two stereo audio channels of music, transmitted over a Bluetooth™ protocol (BT) connection. The user may move the second speaker closer to the first speaker, to increase the probability of the first speaker discovering the second speaker.

In accordance with an example embodiment of the invention, the first speaker may receive the Bluetooth™ Low Energy protocol (BTLE) advertising messages from the second speaker, containing the description of the capabilities of the second speaker, for receiving streaming multimedia content over a Bluetooth™ protocol (BT) connection. The first speaker may measure a signal strength characteristic RSSI of the received Bluetooth™ Low Energy protocol (BTLE) advertising messages to determine the proximity of the second speaker. The first speaker may make an angle-of-arrival (AoA) estimation of the received advertising message by sampling the angle-of-arrival (AoA) data in the received advertising messages.

In accordance with an example embodiment of the invention, the first speaker may transmit to the second speaker, a Bluetooth™ Low Energy protocol (BTLE) message to activate a Bluetooth™ protocol (BT) connection or link for the purpose of streaming multimedia content from the first speaker to the second speaker. The first speaker may also transmit instructions to the second speaker, to play either the left stereo channel, the right stereo channel, or play monaural, based on the angle-of-arrival (AoA) estimation made by the first speaker.

In accordance with an example embodiment of the invention, the first speaker may forward the streaming multimedia content over the Bluetooth™ protocol (BT) connection to the second speaker. The second speaker may play either the left stereo channel, the right stereo channel, or play monaural, as instructed by the first speaker.

In this manner, stereo or surround sound audio or multimedia system may be automatically set up.

FIG. 1A is an illustration of an example embodiment of a network with at least two multimedia devices 102A and 102B, such as audio speakers and/or video displays A and B, a mobile wireless device 100, such as a smart phone, in accordance with at least one embodiment of the present invention. A multimedia device includes, in accordance with at least one example embodiment, at least an individual audio speaker or display device. The mobile wireless device 100 is shown streaming multimedia content, such as two stereo audio channels of music, transmitted over a Bluetooth™ protocol (BT) connection 156 to a first one of the multimedia devices 102A. The second multimedia device 102B is shown periodically transmitting Bluetooth™ Low Energy protocol (BTLE) advertising messages 150 containing a description of the capabilities of the second multimedia device 102B and may additionally contain angle-of-arrival (AoA) data.

The first multimedia devices 102A may include an array of antennas 170A and 170A' arranged for angle-of-arrival (AoA) direction estimation. The second multimedia device 102B may generate and transmit a packet with a single antenna 170B, containing a reference binary bit pattern of AoA data relevant to angle-of-arrival direction finding. An angle-of-arrival (AoA) of the packet may be estimated by the first multimedia device 102A, by sampling the phase and amplitude of the reference bits of the AoA data.

In an example embodiment of the invention, the user interface in the mobile wireless device or phone 100 may help to guide the user to select which speaker is left or right. The user may be guided to move or tilt the phone 100 to the direction where second multimedia device 102B is located. Smart phones typically include a compass and or motion detection feature that senses the orientation of the phone. The user may initially point the phone 100 to a first direction where the first multimedia device 102A is located and press a key on the phone 100 to record the first direction. Then the user may move or tilt the phone to a second direction where the second multimedia device 102B is located, and press the key again to record the second direction. The change from the first direction to the second direction will indicate to the phone 100 whether the second multimedia device 102B is to the left or to the right of the first multimedia device 102A. This will indicate to the phone 100 whether the second multimedia device 102B should play the left stereo channel or the right stereo channel. Then, this left or right channel information may then be provided by the phone 100 to the first multimedia device 102A, which will then forward this left or right channel information to the second multimedia device 102B.

In example embodiments of the invention, the wireless mobile device 100 and the multimedia devices 102A and 102B may include a processor 122 that includes from one to many central processing units (CPUs) 124 and/or 125, a random access memory (RAM) 126, a read only memory (ROM) 127, and interface circuits to interface with one or more radio transceivers 116, antenna 132, 170A/170A', or 170B, and battery or house power sources. A smart phone may include a keypad, display 144, etc. A wireless multimedia device may include a video display device 142 and/or an audio output port 144. The RAM and ROM can be removable memory devices such as smart cards, SIMs, WIMs, semiconductor memories such as RAM, ROM, PROMS, flash memory devices, etc., as shown in FIG. 6. In an example embodiment of the invention, the RAM 126 in the multimedia device 102A may store information contained in received advertising messages 150, for example, a description of the capabilities of the sending second multimedia device 102B, information for angle-of-arrival (AoA) estimation, and measurement data of the characteristic RSSI of received advertising messages 150.

In an example embodiment of the invention, the Bluetooth mobile wireless device 100 includes a Bluetooth™ protocol (BT) 115. The wireless multimedia devices 102A and 102B include both the Bluetooth™ protocol (BT) 115 and the Bluetooth™ Low Energy protocol (BTLE) 114.

In an example embodiment of the invention, the mobile wireless device 100 may be, for example, a miniature device such as a key fob, smart card, jewelry, or the like. In an example embodiment of the invention, the mobile wireless device 100 may be, for example, a relatively larger cell phone, smart phone, flip-phone, PDA, graphic pad. The mobile wireless device 100 may also be in an automobile or other vehicle. The wireless multimedia devices 102A and 102B may be, for example, audio speakers, video displays, or gaming devices that are either in a fixed position or mobile. In embodiments, the relative sizes of devices 100, 102A and 102B may be arbitrary.

FIG. 1B is an illustration of an example embodiment of the network of FIG. 1A, wherein the first multimedia device 102A begins discovering Bluetooth™ Low Energy protocol (BTLE) advertising messages 150 containing a description of a wireless device having multimedia device capabilities for receiving streaming multimedia content, such as two stereo audio channels of music, transmitted over a Bluetooth™ protocol (BT) connection. The user may move the second multimedia device 102B closer to the first multimedia device 102A, to increase the probability of the first multimedia device 102A discovering the second multimedia device 102B.

FIG. 1C is an illustration of an example embodiment of the network of FIG. 1B, wherein the first multimedia device 102A receives the Bluetooth™ Low Energy protocol (BTLE) advertising messages 150 from the second multimedia device 102B, containing the description of the capabilities of the second multimedia device 102B, for receiving streaming multimedia content over a Bluetooth™ protocol (BT) connection. The first multimedia device 102A may measure the signal strength characteristic RSSI of the received Bluetooth™ Low Energy protocol (BTLE) advertising messages 150 to determine the proximity of the second multimedia device 102B. The first multimedia device 102A may make an angle-of-arrival (AoA) estimation of the received advertising message 150 by sampling the angle-of-arrival (AoA) data in the received advertising messages 150.

FIG. 1D is an illustration of an example embodiment of the network of FIG. 1C, wherein the first multimedia device 102A may transmit to the second multimedia device 102B, a Bluetooth™ Low Energy protocol (BTLE) message 160 to activate a Bluetooth™ protocol (BT) connection or link for the purpose of streaming multimedia content from the first multimedia device 102A to the second multimedia device 102B. The first multimedia device 102A may also transmit instructions to the second multimedia device 102B, to play either the left or the right stereo channel, based on the angle-of-arrival (AoA) estimation made by the first multimedia device 102A.

FIG. 1E is an illustration of an example embodiment of the network of FIG. 1D, wherein the first multimedia device 102A is shown forwarding the streaming multimedia content over the Bluetooth™ protocol (BT) connection 166 to the second multimedia device 102B. The second multimedia device 102B may play either the left stereo channel, the right stereo channel, or play monaural, as instructed by the first multimedia device 102A.

FIG. 2A is an illustration of an example sequence diagram for the operations of the mobile wireless device and the first and second multimedia devices 102A and 102B, in FIGS. 1A to 1E. Here Speaker A (102A) starts to receive a music stream 156 from the Mobile device 100. After the stream 156 is started, Speaker A (102A) starts a Bluetooth™ Low Energy protocol (BTLE) scan to search for another speaker. Speaker B (102B) is performing Bluetooth™ Low Energy protocol (BTLE) advertisement 150 at a certain interval, which indicates that it is a speaker (and capable to form multi-device pairing, e.g. is not connected currently). This can be indicated with a certain UUID in the advertising message 150. When Speaker A (102A) gets advertisement 150 from Speaker B (102B), it will check if the sender is capable of forming, for example a stereo pair with another speaker, for example by checking the service universally unique identifier (UUID) in the advertisement field. If it is, then Speaker A (102A) creates a Bluetooth™ Low Energy protocol (BTLE) connection and provides information over Bluetooth™ Low Energy protocol (BTLE) to Speaker B (102B) in order to activate a Bluetooth™ protocol (BT) connection. Speaker A (102A) may also provide other information, such as whether the speaker B (102B) is to be either the left stereo channel, the right stereo channel, or monaural. The selection of the left and the right channel may be based, for example, on the Angle-of-Arrival measurement. The AoA measurement may be a separate process, which may also, for example, be continuous or periodic while the audio is being streamed. After this, the Speaker A (102A) will activate the audio stream over the Bluetooth™ protocol (BT) connection 166 to Speaker B (102B).

FIG. 2B is an illustration of an example flow diagram for the steps performed of the first multimedia device in FIGS. 1A to 1E. Speaker A is activated (i.e. Bluetooth™ protocol (BT) is activated) and once it receives stream of audio (step 202) it will start to perform Bluetooth Low Energy scan (step 204) (The scan may start when Bluetooth™ protocol (BT) is activated). Regarding scan result(s), Speaker A checks if any stereo capable speakers are in the radio range (e.g. indicating this with certain UUID in BLE advertisement field) (step 206), for example, if the RSSI is over certain level. When these requirements are fulfilled, Speaker A exchanges stereo pairing creation information with Speaker B (step 208). Speaker B may deliver (or Speaker A may query) the Bluetooth™ protocol (BT) address of Speaker B or either of the speakers may be set in the discoverable mode. After this, information is exchanged, the Bluetooth™ protocol (BT) of speaker B is activated, and stereo creation is started over the Bluetooth™ protocol connection 166.

FIG. 3A is an illustration of an example sequence diagram for turning off the first and second multimedia devices. Since the Speaker B (102B) is linked to Speaker A (102A) in an ad-hoc manner, the disconnection process may be also handled so that existing connections parameters may be discarded. The disconnection process may be started, for example when the Speaker A (102A) is turned off, which then commands the Speaker B (102B) to also turn off. In another example embodiment, if the Bluetooth™ protocol (BT) connection or link 166 between speakers is disconnected, the Speaker B (102B) may return to the state that it was before the connection was created, e.g. turn off the Speaker B.

FIG. 3B is an illustration of an example flow diagram for the steps performed of the first multimedia device in turning off the second multimedia device. When Speaker A (102A) receives a shut down command (step 302), Speaker A (102A) delivers information to Speaker B (102B) (e.g. in Bluetooth™ Low Energy protocol (BTLE) message 160) to shut down (step 304). In an alternate embodiment, when speaker B (102B) has been in the stereo mode and the Bluetooth™ protocol (BT) connection 166 has been closed, speaker B (102B) shuts off the Bluetooth™ protocol (BT) module.

FIG. 4 is an illustration of an example format for the Bluetooth™ Low Energy protocol (BTLE) advertising messages 150. Devices that transmit advertising packets on the advertising PHY channels are referred to as advertisers. Devices that receive advertising on the advertising channels without the intention to connect to the advertising device are referred to as scanners. Transmissions on the advertising PHY channels occur in advertising events. At the start of each advertising event, the advertiser sends an advertising packet corresponding to the advertising event type. Depending on the type of advertising packet, the scanner may make a request to the advertiser on the same advertising PHY channel which may be followed by a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

Devices that are trying to form a connection to another device listen for connectable advertising packets. Such devices are referred to as initiators. If the advertiser is using a connectable advertising event, an initiator may make a connection request using the same advertising PHY channel on which it received the connectable advertising packet. The advertising event is ended and connection events begin if the advertiser receives and accepts the request for a connection be initiated. Once a connection is established, the initiator becomes the master device in what is referred to as a piconet and the advertising device becomes the slave device. Connection events are used to send data packets between the master and slave devices.

The format of Advertising data in Bluetooth™ Low Energy protocol (BTLE) advertising messages 150, and Scan Response data, is shown in FIG. 4. The data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length—1 octet in the Data field depends on the value of the AD type field and is called the AD data. The non-significant part extends the Advertising and Scan Response data to 31 octets and shall contain all-zero octets. AoA data is optional data that may be included to provide improved stereo/surround experience as the (master) wireless output device may identify left/right streams based on the AoA information.

FIG. 5A is an illustration of an example flow diagram 500 of an example process in the wireless multimedia device 102A, carrying out the example operations, in accordance with at least one embodiment of the present invention. The steps of the flow diagram represent computer code instructions stored in the RAM and/or ROM memory of the multimedia device 102B, which when executed by the central processing units (CPU) 125, carry out the functions of the example embodiments of the invention. The steps may be carried out in another order than shown and individual steps may be combined or separated into component steps. The flow diagram has the following steps:

Step 502: receiving, by an apparatus, streaming content over a first wireless carrier, from a source device;

Step 504: discovering, by the apparatus, wireless messages over a second wireless carrier, associated with presence of a wireless device capable of receiving streaming content over the first wireless carrier and capable of reproducing at least a portion of the received streaming content;

Step 506: determining, by the apparatus, that wireless messages received from another wireless device over the second wireless carrier, indicate a wireless device capable of receiving streaming content over the first wireless carrier and capable of reproducing at least a portion of the received streaming content; and Step 508: activating, by the apparatus, over the second wireless carrier, a wireless connection with the other wireless device over the first wireless carrier, and forwarding the streaming content over the wireless connection to the other wireless device.

FIG. 5B is an illustration of an example flow diagram 550 of an example process in the wireless multimedia device 102B, carrying out the example operations, in accordance with at least one embodiment of the present invention. The steps of the flow diagram represent computer code instructions stored in the RAM and/or ROM memory of the multimedia device 102B, which when executed by the central processing units (CPU) 125, carry out the functions of the example embodiments of the invention. The steps may be carried out in another order than shown and individual steps may be combined or separated into component steps. The flow diagram has the following steps:

Step 552: transmitting, by the apparatus, wireless messages over a second wireless carrier, indicating the apparatus is a wireless device capable of receiving streaming content over a first wireless carrier and is capable of reproducing at least a portion of the received streaming content;

Step 554: receiving, by the apparatus, from another wireless device over the second wireless carrier, a response to the wireless messages, to activate a wireless connection with the other wireless device over the first wireless carrier; and Step 556: receiving streaming content via the wireless connection from the other wireless device.

FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable non-transitory media such as resident memory devices, smart cards or other removable memory devices, thereby making a computer program product or article of manufacture according to the embodiments.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
   receiving, by an apparatus, streaming content over a first wireless carrier, from a source device;
   discovering, by the apparatus, wireless messages over a second wireless carrier;
   determining, by the apparatus, that wireless messages received over the second wireless carrier, indicate a wireless device capable of receiving streaming content over the first wireless carrier and capable of reproducing at least a portion of the received streaming content; and
   activating, by the apparatus, over the second wireless carrier, a wireless connection with the other wireless device over the first wireless carrier, and forwarding the streaming content received from the source device, over the wireless connection to the other wireless device.

2. The method of claim 1, further comprising:
   measuring, by the apparatus, signal strength of the wireless messages received from the other wireless device over the second wireless carrier, to determine proximity of the other wireless device; and
   activating, by the apparatus, the wireless connection with the other wireless device over the first wireless carrier, if the measured signal strength of the wireless messages received from the other wireless device is greater than a predefined threshold value.

3. The method of claim 1, further comprising:
   measuring, by the apparatus, an angle-of-arrival of the wireless messages received from the other wireless device over the second wireless carrier, to determine a location of the other wireless device; and
   transmitting, by the apparatus, to the other wireless device, an indication of a stereo channel to be reproduced from the streaming content received over the first wireless carrier by the other wireless device, based on the measured angle-of-arrival.

4. The method of claim 1, further comprising:
   receiving, by the apparatus, a power-off indication over the first wireless carrier, from the source device;
   transmitting, by the apparatus, over the second wireless carrier, a power-off indication to the other wireless device; and
   resuming discovering, by the apparatus, wireless messages over the second wireless carrier, associated with presence of a wireless device capable of receiving streaming content over the first wireless carrier and capable of reproducing at least a portion of the received streaming content.

5. A method, comprising:
   transmitting, by an apparatus, wireless messages over a second wireless carrier, indicating the apparatus is a wireless device capable of receiving streaming content over a first wireless carrier and is capable of reproducing at least a portion of the received streaming content;
   receiving, by the apparatus, from another wireless device over the second wireless carrier, a response to the wireless messages, to activate a wireless connection with the other wireless device over the first wireless carrier; and
   receiving streaming content via the wireless connection from the other wireless device.

6. The method of claim 5, further comprising:
   inserting, by the apparatus, angle-of-arrival data relevant to angle-of-arrival direction finding, in the wireless messages transmitted over the second wireless carrier; and
   receiving, by the apparatus, from the other wireless device, an indication of a stereo channel to be reproduced from the streaming content received by the apparatus over the first wireless carrier, based on a measured angle-of-arrival.

7. The method of claim 5, further comprising:
   reproducing, by the apparatus, at least one channel from the streaming content received by the apparatus over the first wireless carrier;
   receiving, by the apparatus, over the second wireless carrier, a power-off indication from the other wireless device; and
   turning off, by the apparatus, reproduction of the at least one channel from the streaming content received by the apparatus over the first wireless carrier.

8. An apparatus, comprising:
   at least one processor;
   at least one memory including computer program code;
   the at least one memory and the computer program code configured to, with the at least one processor, cause the apparatus at least to:

receive streaming content over a first wireless carrier, from a source device;

discover wireless messages over a second wireless carrier;

determine that wireless messages received over the second wireless carrier, indicate a wireless device capable of receiving streaming content over the first wireless carrier and capable of reproducing at least a portion of the received streaming content; and activate over the second wireless carrier, a wireless connection with the other wireless device over the first wireless carrier, and forward the streaming content received from the source device, over the wireless connection to the other wireless device.

9. The apparatus of claim 8, further comprising:

the at least one memory and the computer program code configured to, with the at least one processor, cause the apparatus at least to:

measure signal strength of the wireless messages received from the other wireless device over the second wireless carrier, to determine proximity of the other wireless device; and activate the wireless connection with the other wireless device over the first wireless carrier, if the measured signal strength of the wireless messages received from the other wireless device is greater than a predefined threshold value.

10. The apparatus of claim 8, further comprising:

the at least one memory and the computer program code configured to, with the at least one processor, cause the apparatus at least to:

measure an angle-of-arrival of the wireless messages received from the other wireless device over the second wireless carrier, to determine a location of the other wireless device; and transmit to the other wireless device, an indication of a stereo channel to be reproduced from the streaming content received over the first wireless carrier by the other wireless device, based on the measured angle-of-arrival.

11. The apparatus of claim 8, further comprising:

the at least one memory and the computer program code configured to, with the at least one processor, cause the apparatus at least to:

receive a power-off indication over the first wireless carrier, from the source device;

transmit over the second wireless carrier, a power-off indication to the other wireless device; and resume discovering wireless messages over the second wireless carrier, associated with presence of a wireless device capable of receiving streaming content over the first wireless carrier and capable of reproducing at least a portion of the received streaming content.

12. An apparatus, comprising:

at least one processor;

at least one memory including computer program code;

the at least one memory and the computer program code configured to, with the at least one processor, cause the apparatus at least to:

transmit wireless messages over a second wireless carrier, indicating the apparatus is a wireless device capable of receiving streaming content over a first wireless carrier and is capable of reproducing at least a portion of the received streaming content;

receive from another wireless device over the second wireless carrier, a response to the wireless messages, to activate a wireless connection with the other wireless device over the first wireless carrier; and receive streaming content via the wireless connection from the other wireless device.

13. The apparatus of claim 12, further comprising:

the at least one memory and the computer program code configured to, with the at least one processor, cause the apparatus at least to:

insert angle-of-arrival data relevant to angle-of-arrival direction finding, in the wireless messages transmitted over the second wireless carrier; and receive from the other wireless device, an indication of a stereo channel to be reproduced from the streaming content received by the apparatus over the first wireless carrier, based on a measured angle-of-arrival.

14. The apparatus of claim 12, further comprising:

the at least one memory and the computer program code configured to, with the at least one processor, cause the apparatus at least to:

reproduce at least one channel from the streaming content received by the apparatus over the first wireless carrier;

receive over the second wireless carrier, a power-off indication from the other wireless device; and turn off reproduction of the at least one channel from the streaming content received by the apparatus over the first wireless carrier.

15. A computer program product comprising computer executable program code recorded on a computer readable, non-transitory storage medium, the computer executable program code comprising:

code for receiving, by an apparatus, streaming content over a first wireless carrier, from a source device;

code for discovering, by the apparatus, wireless messages over a second wireless carrier;

code for determining, by the apparatus, that wireless messages received over the second wireless carrier, indicate a wireless device capable of receiving streaming content over the first wireless carrier and capable of reproducing at least a portion of the received streaming content; and code for activating, by the apparatus, over the second wireless carrier, a wireless connection with the other wireless device over the first wireless carrier, and forwarding the streaming content received from the source device, over the wireless connection to the other wireless device.

16. The computer program product of claim 15, further comprising:

code for measuring, by the apparatus, signal strength of the wireless messages received from the other wireless device over the second wireless carrier, to determine proximity of the other wireless device; and code for activating, by the apparatus, the wireless connection with the other wireless device over the first wireless carrier, if the measured signal strength of the wireless messages received from the other wireless device is greater than a predefined threshold value.

17. The computer program product of claim 15, further comprising:

code for measuring, by the apparatus, an angle-of-arrival of the wireless messages received from the other wireless device over the second wireless carrier, to determine a location of the other wireless device; and code for transmitting, by the apparatus, to the other wireless device, an indication of a stereo channel to be reproduced from the streaming content received over the first wireless carrier by the other wireless device, based on the measured angle-of-arrival.

18. The computer program product of claim 15, further comprising:

code for receiving, by the apparatus, a power-off indication over the first wireless carrier, from the source device;

code for transmitting, by the apparatus, over the second wireless carrier, a power-off indication to the other wireless device; and code for resuming discovering, by the apparatus, wireless messages over the second wireless carrier, associated with presence of a wireless device capable of receiving streaming content over the first wireless carrier and capable of reproducing at least a portion of the received streaming content.

19. A computer program product comprising computer executable program code recorded on a computer readable, non-transitory storage medium, the computer executable program code comprising:

code for transmitting, by an apparatus, wireless messages over a second wireless carrier, indicating the apparatus is a wireless device capable of receiving streaming content over a first wireless carrier and is capable of reproducing at least a portion of the received streaming content;

code for receiving, by the apparatus, from another wireless device over the second wireless carrier, a response to the wireless messages, to activate a wireless connection with the other wireless device over the first wireless carrier; and code for receiving streaming content via the wireless connection from the other wireless device.

20. The computer program product of claim 19, further comprising:

code for inserting, by the apparatus, angle-of-arrival data relevant to angle-of-arrival direction finding, in the wireless messages transmitted over the second wireless carrier; and code for receiving, by the apparatus, from the other wireless device, an indication of a stereo channel to be reproduced from the streaming content received by the apparatus over the first wireless carrier, based on a measured angle-of-arrival.

21. The computer program product of claim 19, further comprising:

code for reproducing, by the apparatus, at least one channel from the streaming content received by the apparatus over the first wireless carrier;

code for receiving, by the apparatus, over the second wireless carrier, a power-off indication from the other wireless device; and code for turning off, by the apparatus, reproduction of the at least one channel from the streaming content received by the apparatus over the first wireless carrier.

* * * * *